(12) United States Patent
Yamamoto et al.

(10) Patent No.: US 8,630,887 B2
(45) Date of Patent: Jan. 14, 2014

(54) BUSINESS PROCESS FLOWCHART EDITING PROGRAM AND BUSINESS PROCESS FLOWCHART EDITING METHOD

(75) Inventors: Rieko Yamamoto, Kawasaki (JP); Kyoko Ohashi, Kawasaki (JP); Kouji Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 975 days.

(21) Appl. No.: 12/366,444

(22) Filed: Feb. 5, 2009

(65) Prior Publication Data

US 2009/0144119 A1   Jun. 4, 2009

Related U.S. Application Data

(63) Continuation of application No. PCT/JP2006/315766, filed on Aug. 9, 2006.

(51) Int. Cl.
*G06Q 10/00* (2012.01)

(52) U.S. Cl.
USPC .......................................... 705/7.28; 705/7.27

(58) Field of Classification Search
USPC ................................................ 705/7.27, 7.28
See application file for complete search history.

(56) References Cited

U.S. PATENT DOCUMENTS

| | | | | |
|---|---|---|---|---|
| 4,813,013 A * | 3/1989 | Dunn | ............................. | 715/763 |
| 5,621,871 A * | 4/1997 | Jaremko et al. | ................ | 345/441 |
| 6,233,537 B1 * | 5/2001 | Gryphon et al. | ................... | 703/1 |
| 6,243,101 B1 * | 6/2001 | Erskine | .......................... | 345/619 |
| 6,289,385 B1 * | 9/2001 | Whipple et al. | ............... | 709/229 |
| 6,393,425 B1 * | 5/2002 | Kelly | .................................... | 1/1 |
| 6,460,058 B2 * | 10/2002 | Koppolu et al. | ............... | 715/738 |
| 6,604,114 B1 * | 8/2003 | Toong et al. | ........................... | 1/1 |
| 7,467,198 B2 * | 12/2008 | Goodman et al. | ............. | 709/223 |
| 7,506,302 B2 * | 3/2009 | Bahrami | ........................ | 717/100 |
| 7,631,291 B2 * | 12/2009 | Shukla et al. | .................. | 717/107 |
| 7,933,786 B2 * | 4/2011 | Wargin et al. | ........................ | 705/4 |
| 2002/0010741 A1 * | 1/2002 | Stewart et al. | ................. | 709/204 |
| 2002/0013759 A1 * | 1/2002 | Stewart et al. | ................... | 705/37 |
| 2002/0174093 A1 * | 11/2002 | Casati et al. | ....................... | 707/1 |
| 2003/0028389 A1 * | 2/2003 | Casati et al. | ....................... | 705/1 |
| 2004/0243640 A1 * | 12/2004 | Bostleman et al. | ......... | 707/104.1 |
| 2005/0015293 A1 * | 1/2005 | Henn et al. | .......................... | 705/9 |
| 2005/0197952 A1 * | 9/2005 | Shea et al. | ....................... | 705/38 |

(Continued)

FOREIGN PATENT DOCUMENTS

| | | |
|---|---|---|
| JP | A 2000-132383 | 5/2000 |
| JP | 2002-063323 | 2/2002 |

(Continued)

OTHER PUBLICATIONS

Sarbanes-Oxley Act [Pdf] from logitax.huSO Act—United States of America 107th congress, US Congress . . . , 2002—logitax.hu.*

(Continued)

*Primary Examiner* — Jonathan G Sterrett
(74) *Attorney, Agent, or Firm* — Greer Burns & Crain, Ltd.

(57) ABSTRACT

A business process flowchart editing apparatus manages information about a business process flowchart and risks and controls, and their relation into a business process model in a unified manner, and is provided with an editing function of editing these pieces of information and an analyzing function of inconsistency check and analysis on a change ripple, thereby increasing efficiency in documentation of internal control.

15 Claims, 24 Drawing Sheets

(56) References Cited

U.S. PATENT DOCUMENTS

| | | | |
|---|---|---|---|
| 2005/0240592 A1* | 10/2005 | Mamou et al. | 707/9 |
| 2007/0055596 A1* | 3/2007 | Yankovich et al. | 705/35 |
| 2007/0214173 A1 | 9/2007 | Ohashi et al. | |
| 2007/0233508 A1* | 10/2007 | Gillespie | 705/1 |
| 2008/0065453 A1* | 3/2008 | Settuducati | 705/8 |
| 2009/0070158 A1* | 3/2009 | Virine et al. | 705/7 |
| 2009/0144120 A1* | 6/2009 | Ramachandran | 705/9 |
| 2009/0281777 A1* | 11/2009 | Baeuerle et al. | 703/6 |

FOREIGN PATENT DOCUMENTS

| | | |
|---|---|---|
| JP | 2005-208855 | 8/2005 |
| WO | WO 2005106721 A1 * | 11/2005 |
| WO | WO 2006/033159 A1 | 3/2006 |

OTHER PUBLICATIONS

"The SOX Act measure software," Nikkei Computer, Apr. 17, 2006, pp. 58-65.

Office Action issued by the Patent Office of Japan for related JP Patent Application No. 2008-528683 mailed Sep. 6, 2011 (with English language translation).

Inoue, Toru "ERP/Accounting and Business Package",—To Strengthen Internal Control by Preventing Improper Accounting—, Nikkei Computer, Japan, Nikkei Business Publications, Inc., Mar. 20, 2006, No. 648, pp. 172-189.

* cited by examiner

FIG.10

| IDEN-TIFIER | BUSINESS PROCESS NAME | ... | RELATED RISK | | RELATED CONTROL | |
|---|---|---|---|---|---|---|
| | | | IDEN-TIFIER | NAME | IDEN-TIFIER | NAME |
| g1_P1 | ACCEPT ORDER | ... | g1_R1 | R1 | g1_C1 | C1 |
| | | ... | g1_R2 | R2 | g1_C2 | C2 |
| | | | | | g1_C3 | C3 |
| g1_P2 | INPUT ORDER DATA | ... | g1_R1 | R1 | g1_C3 | C3 |

FIG.11

| IDENTIFIER | NAME | DEGREE OF IMPORTANCE | FREQUENCY | TYPE | ... |
|---|---|---|---|---|---|
| g1_R1 | R1 | HIGH | DAILY | ENVIRONMENT | ... |
| g1_R2 | R2 | INTERME-DIATE | SEMIMONTHLY | FINANCIAL STATEMENT | ... |
| ... | ... | ... | ... | ... | ... |

FIG.12

| IDENTIFIER | NAME | DEGREE OF IMPORTANCE | FREQUENCY | ... |
|---|---|---|---|---|
| g1_C1 | C1 | HIGH | DAILY | ... |
| g1_C2 | C2 | INTERMEDIATE | WEEKLY | ... |
| ... | ... | ... | ... | ... |

FIG.13

| BUSINESS PROCESS IDENTIFIER | BUSINESS PROCESS NAME | ... | RELATED RISK IDENTIFIER | RELATED RISK NAME | ... | RELATED CONTROL NAME | RELATED CONTROL | ... |
|---|---|---|---|---|---|---|---|---|
| g1_P1 | ACCEPT ORDER |  | g1_R1 | R1 |  | g1_C1 | C1 | ... |
| g1_P1 | ACCEPT ORDER |  | g1_R2 | R2 |  | g1_C2 | C2 | ... |
| g1_P1 | ACCEPT ORDER |  | g1_R2 | R2 |  | g1_C3 | C3 | ... |
| g1_P2 | ORDER DATA |  | g1_R1 | R1 |  | g1_C3 | C3 | ... |
| ... |  |  |  |  |  |  | ... | ... |

FIG.14

| BUSINESS PROCESS FLOW NAME | BUSINESS PROCESS | DETAILS OF BUSINESS PROCESS | CONTROL NAME | DETAILS OF CONTROL | PRACTICAL SUPERVISOR |
|---|---|---|---|---|---|
| ORDER PROCESS | ACCEPT ORDER | ... | C1 | CHECK BY PLURALITY OF PERSONS IN CHARGE | MANAGEMENT DIVISION |
| ORDER PROCESS | ORDER DATA | ... | C2 | ... | MANAGEMENT DIVISION |
| ... | ... | ... | ... | ... | ... |

FIG.17

| RISK | PRESENCE OR ABSENCE OF USE PORTION (T/F) |
|---|---|
| R1 | T |
| R2 | T |
| R3 | T |
| R4 | F |

| CONTROL | PRESENCE OR ABSENCE OF USE PORTION (T/F) |
|---|---|
| C1 | T |
| C2 | T |
| C3 | T |
| C4 | F |

FIG.21

| RISK | CONTROLLED (T/F) |
|------|------------------|
| R1 | T |
| R2 | T |
| R3 | F |
| R4 | F |

| CHANGE-TARGET RISK | CHANGE-RIPPLE TARGET (BUSINESS PROCESS) |
|---|---|
| R1 | ACCEPT ORDER |
| R1 | INPUT ORDER DATA |

FIG.26

| CHANGE-TARGET RISK | CHANGE-RIPPLE TARGET (STATISTIC) |
|---|---|
| R1 | C1 |
| R1 | C3 |

FIG.28

| CHANGE-TARGET CONTROL | CHANGE-RIPPLE TARGET (BUSINESS PROCESS) |
|---|---|
| C3 | INPUT ORDER DATA |

FIG.29

| CHANGE-TARGET CONTROL | CHANGE-RIPPLE TARGET (RISK) |
|---|---|
| C3 | R1 |
| C3 | R2 |

BUSINESS PROCESS FLOWCHART EDITING PROGRAM AND BUSINESS PROCESS FLOWCHART EDITING METHOD

CROSS-REFERENCE TO RELATED APPLICATIONS

This application is a continuation of PCT international application Ser. No. PCT/JP2006/315766 filed on Aug. 9, 2006 which designates the United States, the entire contents of which are incorporated herein by reference.

BACKGROUND

1. Field

The present invention relates to a business process flowchart editing program and business process flowchart editing method for editing a business process flowchart and, in particular, to a business process flowchart editing program and business process flowchart editing method capable of supporting appropriate description of risks and controls and making an editing work efficient to create a business process flowchart.

2. Description of the Related Art

To comply with a so-called Japanese-version's Sarbanes-Oxley (SOX) Act, companies are required to visualize their own works by using a business process flowchart. The business process flowchart is generated according to, for example, a format of an activity diagram in Unified Modeling Language (UML). In the business process flowchart, business processes forming a work and their flow are represented.

In a company, various works are performed. Representing all of these works as a business process flowchart and further revising these according to changes of works impose a considerable burden. For this reason, there is a strong need for a technology of supporting efficient editing of a business process flowchart.

An example of such a technology of supporting efficient editing of a business process flowchart is disclosed in International Patent Publication No. 2006/033159. In the technology disclosed in this gazette, it is automatically verified based on a rule registered in advance whether a connection of each business process described in a business process flowchart is appropriate.

However, in the technology disclosed in International Patent Publication No. 2006/033159, for example, although it is important in the business process flowchart generated to comply with a so-called Japanese version's SOX Act to appropriately describe risks and controls in association with each business process, an operation of describing risks and controls is not supported, while an operation of describing business processes and their flow is supported.

SUMMARY

It is an object of the present invention to at least partially solve the problems in the conventional technology.

According to an aspect of an embodiment, a business process flowchart editing apparatus includes a shared-object editing unit configured to register in advance an object including information about a risk that occurs in a business process and an object including information about a control that handles the risk, the object being registered as shared objects; and a layout editing unit configured to place a graphic element corresponding to any of the objects registered by the shared-object editing unit on a business process flowchart and to associate the graphic element with the business process forming the business process flowchart, wherein the layout editing unit, when the graphic element corresponding to the object including the information about the control is related to the business process, generates a data structure in which data corresponding to the object and data corresponding to the business process are related to each other.

According to another aspect of an embodiment, a business process flowchart editing method includes registering in advance an object including information about a risk that occurs in a business process and an object including information about a control that handles the risk, the objects being registered as shared objects; placing a graphic element corresponding to any of the registered objects on a business process flowchart; associating the graphic element with the business process forming the business process flowchart; and generating, when the graphic element corresponding to the object including the information about the control is related to the business process, a data structure in which data corresponding to the object and data corresponding to the business process are related to each other.

According to still another aspect of an embodiment, a business process flowchart editing program product causes a computer to perform the method according to the present invention.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

FIG. 10 is a drawing of an example of a tabular edit screen for editing a business process;

FIG. 11 is a drawing of an example of a tabular edit screen for editing risks;

FIG. 12 is a drawing of an example of a tabular edit screen for editing controls;

FIG. 13 is a drawing of an example of an edit screen in a RCM format;

FIG. 14 is a drawing of an example of a report generated by a report generating unit;

FIG. 17 is a drawing of an example of an output of the process of checking consistency between risks and business processes by the consistency checking unit;

FIG. 21 is a drawing of an example of an output of the process of checking consistency between risks and controls by the consistency checking unit;

FIG. 26 is a drawing of an example of an output of the other risk-change ripple analyzing process by the change-ripple analyzing unit;

FIG. 28 is a drawing of an example of an output of the control-change ripple analyzing process by the change-ripple analyzing unit;

FIG. 29 is a drawing of an example of the output of the control-change ripple analyzing process by the ripple analyzing unit.

DETAILED DESCRIPTION OF THE PREFERRED EMBODIMENTS

Embodiments of the business process flowchart editing program and business process flowchart editing method according to the present invention are explained in detail below based on the drawings. Note that these embodiments do not restrict the present invention.

Figure 1:
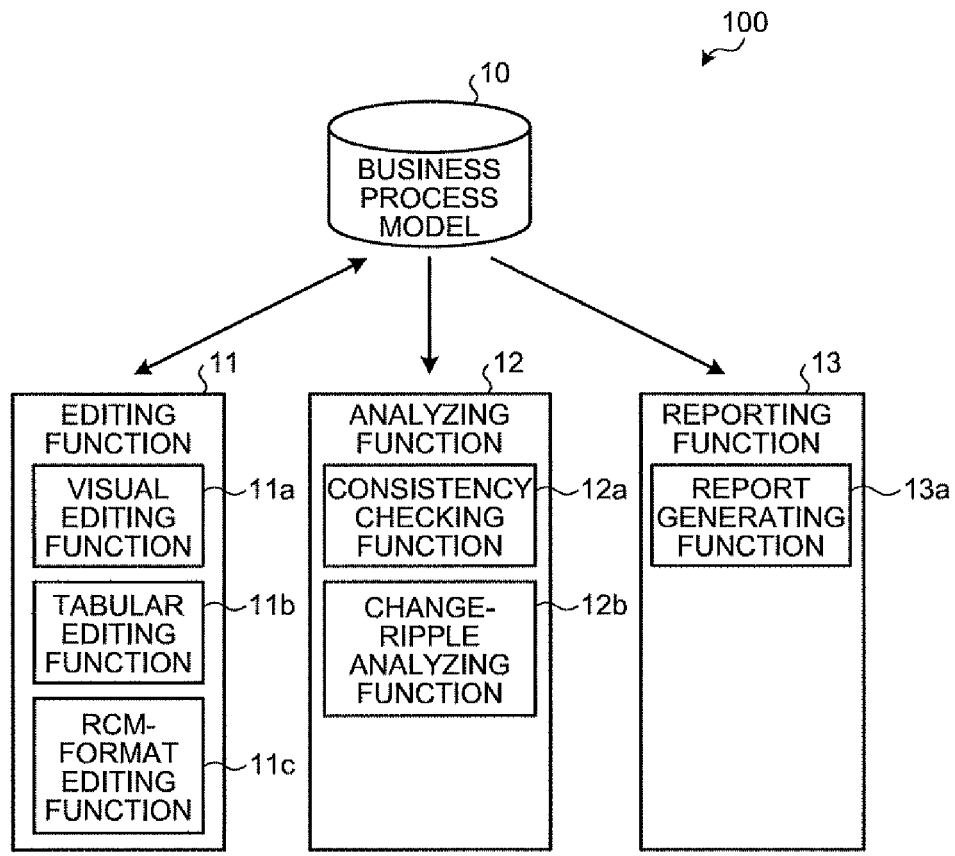
FIG. 1 is a drawing of a general outline of a business process flowchart editing apparatus according to an embodiment.

First, a general outline of a business process flowchart editing apparatus 100 according to an embodiment is explained. FIG. 1 is a drawing of the general outline of the business process flowchart editing apparatus 100 according to the present embodiment. As depicted in FIG. 1, the business process flowchart editing apparatus 100 includes an editing function 11, an analyzing function 12, and a reporting function 13.

The editing function 11 is a function of editing a business process model 10 in which various types of information forming a business process flowchart are stored in a predetermined format. In the business process model 10, information representing business processes forming a business process flowchart and their flow, information representing a risk occurring in a business process, and information representing a control for handling a risk are stored.

The editing function 11 includes a visual editing function 11a, a tabular editing function 11b, and a Risk Control Matrix (RCM)-format editing function 11c. The visual editing function 11a is a function of presenting to a user a visual edit screen, where the user is caused to edit graphic elements corresponding to various information included in the business process model 10.

The tabular editing function 11b is a function of causing the user to edit various information included in the business process model 10 in a tabular format. The RCM-format editing function 11c is a function of causing the user to combine various information included in the business process model 10 for editing in an RCM format. An RCM is a document representing a relation between a risk and a control, and is generally used in an audit.

While a general business process flowchart editing apparatus only have a function corresponding to the visual editing function 11a, the business process flowchart editing apparatus 100 according to the present embodiment includes the tabular editing function 11b and the RCM-format editing function 11c, thereby making a quick editing operation possible. For example, when changes are made to a plurality of elements forming a business process flowchart, directly rewriting a relevant portion in a table is often superior in operation efficiency to selecting graphic elements one by one on a visual edit screen.

The analyzing function is a function of performing various analyses based on the business process model 10, and includes a consistency checking function 12a and a change-ripple analyzing function 12b. The consistency checking function 12a is a function of checking whether business processes, risks, and controls included in the business process model 10 are appropriately connected and outputting the result. In a large corporation, an enormous number of business process flowcharts are required to be generated, and a business process flow verifying operation imposes a considerable burden. A function of automatically checking whether various elements, including risks and controls, that form a business process flowchart are appropriately connected is very important in making a business process flowchart verifying operation efficient and improving the quality of a business process flowchart to be generated.

The change-ripple analyzing function 12b is a function of analyzing which element is influenced by a change of any risk and control included in the business process model 10 and outputting the result. To increase efficiency in a business process flowchart editing operation, the business process model 10 has a structure capable of associating risks and controls associated with a business process with another business process without inputting these risks and controls again. Thus, when any risk or control included in the business process model 10 is inadvertently changed, another portion associated with the same risk and control may also be influenced. The change-ripple analyzing function 12b detects such a portion, thereby preventing a change of the business process flowchart from inadvertently influencing another portion.

The reporting function 13 is a function of outputting various reports, and includes a report generating function 13a. The report generating function 13a is a function of generating various reports required for an audit or walk-through based on the business process model 10. A general business process flowchart editing apparatus does not have a function of generating reports other than those in RCM. The report generating function 13a can generate various reports by classifying information included in the business process model 10 according to the purpose.

Figure 2:
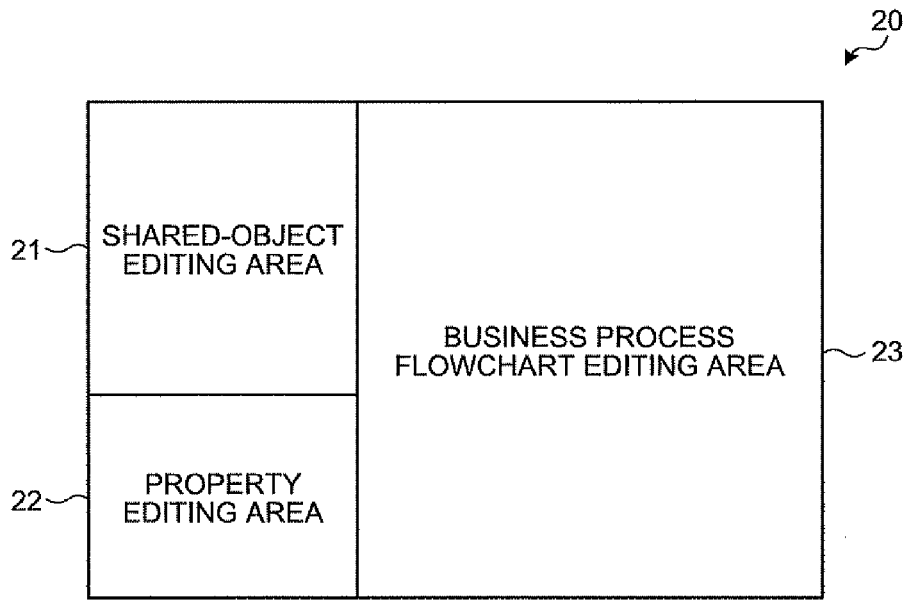
FIG. 2 is a drawing of an example of an edit screen displayed by a visual editing function.

Next, an edit screen displayed by the visual editing function 11a is explained. FIG. 2 is a drawing of an example of an edit screen displayed by the visual editing function 11a. As depicted in FIG. 2, an edit screen 20 includes a shared-object editing area 21 occupying an upper part on the left side of the screen, a property editing area 22 occupying a lower part thereon, and a business process flowchart editing area 23 occupying the other part.

The shared-object editing area 21 is an area where various graphic elements required for generating a business process flowchart are registered. The property editing area 22 is an area where attributes of objects corresponding to the graphic elements laid out in the business process flowchart editing area 23 are edited. The business process flowchart editing area 23 is an area where the graphic elements registered in the shared-object editing area 21 are laid out to generate a business process flowchart.

Figure 3:
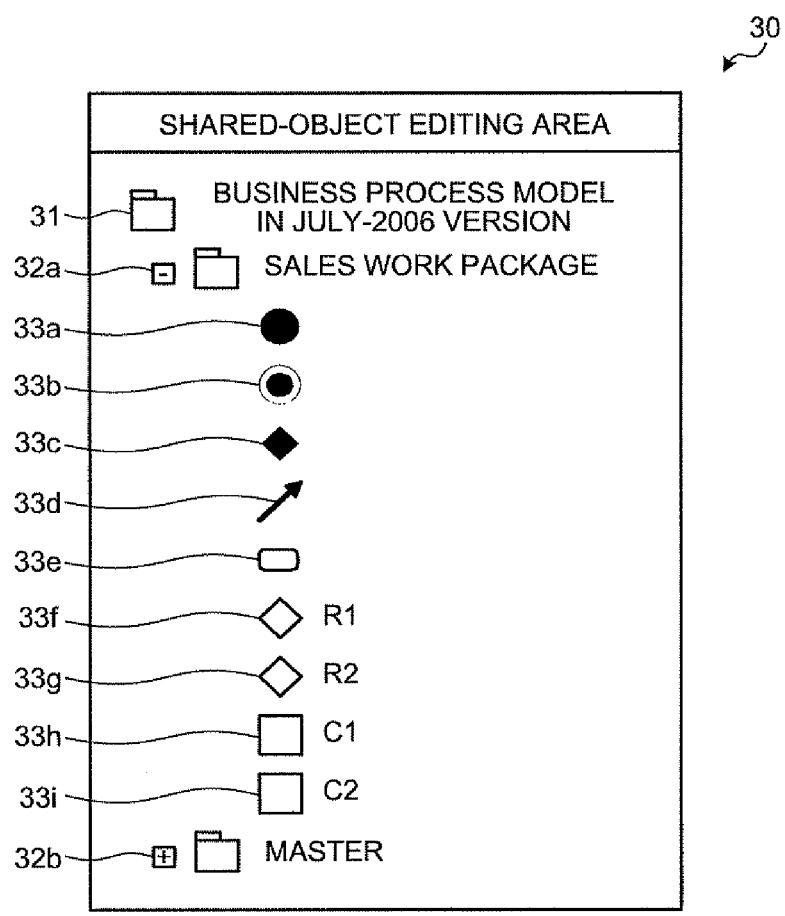
FIG. 3 is an example of a screen displayed in a shared-object editing area.

An example of a screen displayed in the shared-object editing area 21 is depicted in FIG. 3. As depicted in FIG. 3, a screen 30 has a tree structure, in which, under a business process model 31 with a name "business process model in July-2006 version", a package 32a with a name "sales work package" and a package 32b with a name "master" are placed.

Also, under the package 32a, a graphic element 33a indicative of a start of a business process flow, a graphic element 33b indicative of an end of the business process flow, a graphic element 33c indicative of decision, a graphic element 33d indicative of a flow between business processes, and a graphic element 33e indicative of a business process, as well as a graphic element 33f indicative of a risk with a name "R1", a graphic element 33g indicative of a risk with a name "R2", a graphic element 33h indicative of a control with a name "C1", and a graphic element 33i indicative of a control with a name "C2" are placed.

In the screen 30, risks with predetermined detail, such as risks indicated by the graphic element 33f and the graphic element 33g, and controls with predetermined details, such as controls indicated by the graphic element 33h and the graphic element 33i, can be registered in advance. These plural risks and controls registered in advance can be placed on a business process flowchart as shared objects so as to be associated with different business processes. When a business process flowchart is generated, risks and controls with the same details are often required at a plurality of portions. Therefore, taking the risks and controls as shared objects increases efficiency in a business process flowchart editing operation.

Figure 4:
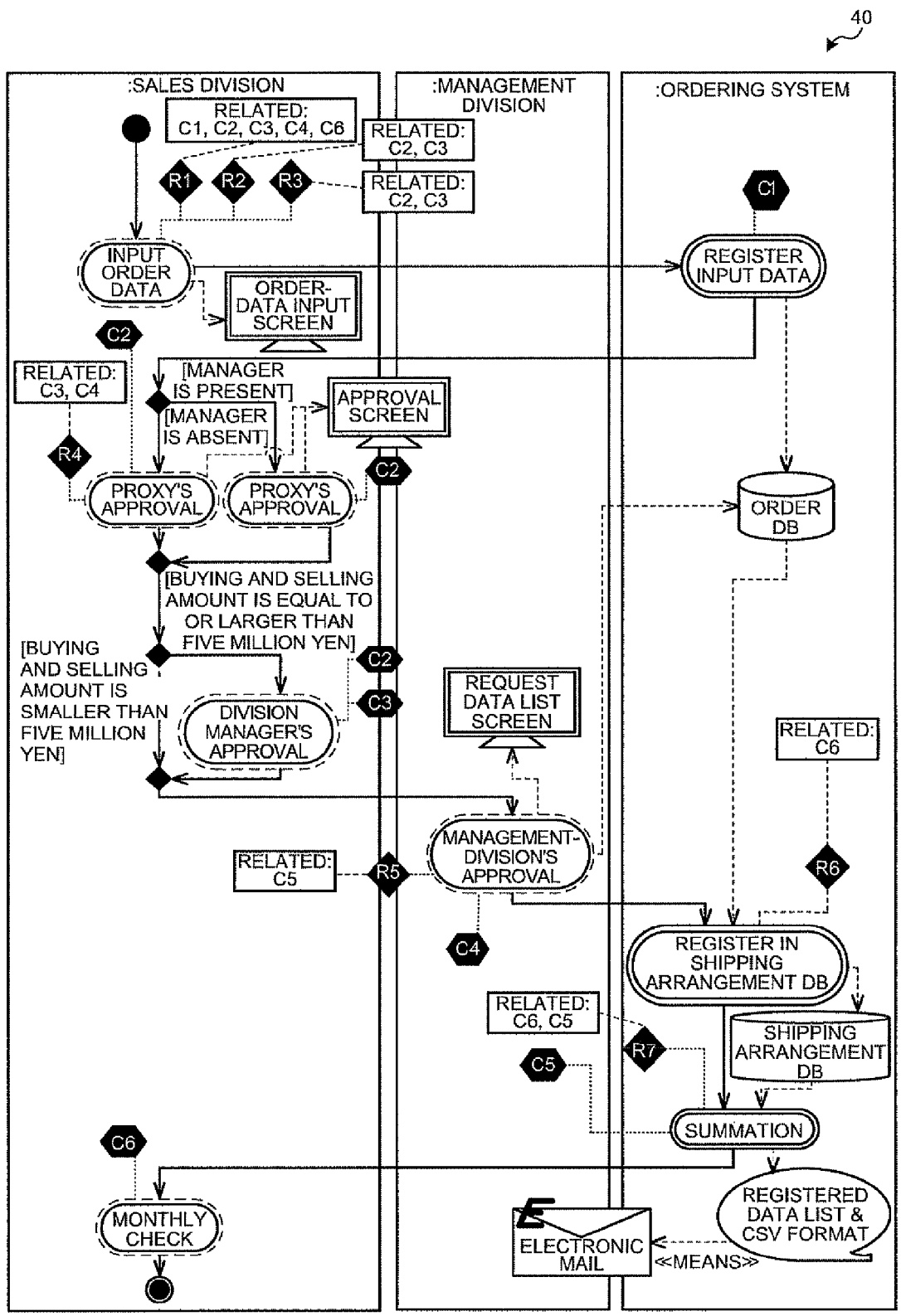
FIG. 4 is a drawing of an example of a screen displayed in a business process flowchart editing area.

An example of a screen displayed in the business process flowchart editing area 23 is depicted in FIG. 4. A screen 40 is a screen where various graphic elements included in the screen 30 are laid out to generate a business process flowchart. As depicted in FIG. 4, in the business process flowchart editing apparatus 100 according to the present embodiment, in addition to associating a control with a business process via a risk, it is possible to directly associate a control with a business process.

When a risk may occur in a business process, such a risk has to be handled with some control. This relation can be represented by any business process flowchart editing apparatus supporting internal control by associating a control with a business process via a risk. However, normally, while a business process where a control is performed is different from a business process where a risk may occur, the conventional business process flowchart editing apparatus cannot represent a business process where a control is performed.

In the business process flowchart editing apparatus 100 according to the present embodiment, a control can be directly associated with a business process, thereby clearly demonstrating that the control is performed in that business process.

For example, in FIG. 4, a business process "input order data" is associated with a risk "R1", and the risk "R1" is associated with a control "C1". Also, a business process "register input data" following the business process "input order data" is directly associated with the control "C1". This indicates that, while the control "C1" is required for handling the risk "R1", that control is performed on not the business process "input order data" associated with the risk "R1" but the next business process "register input data".

Figure 5:
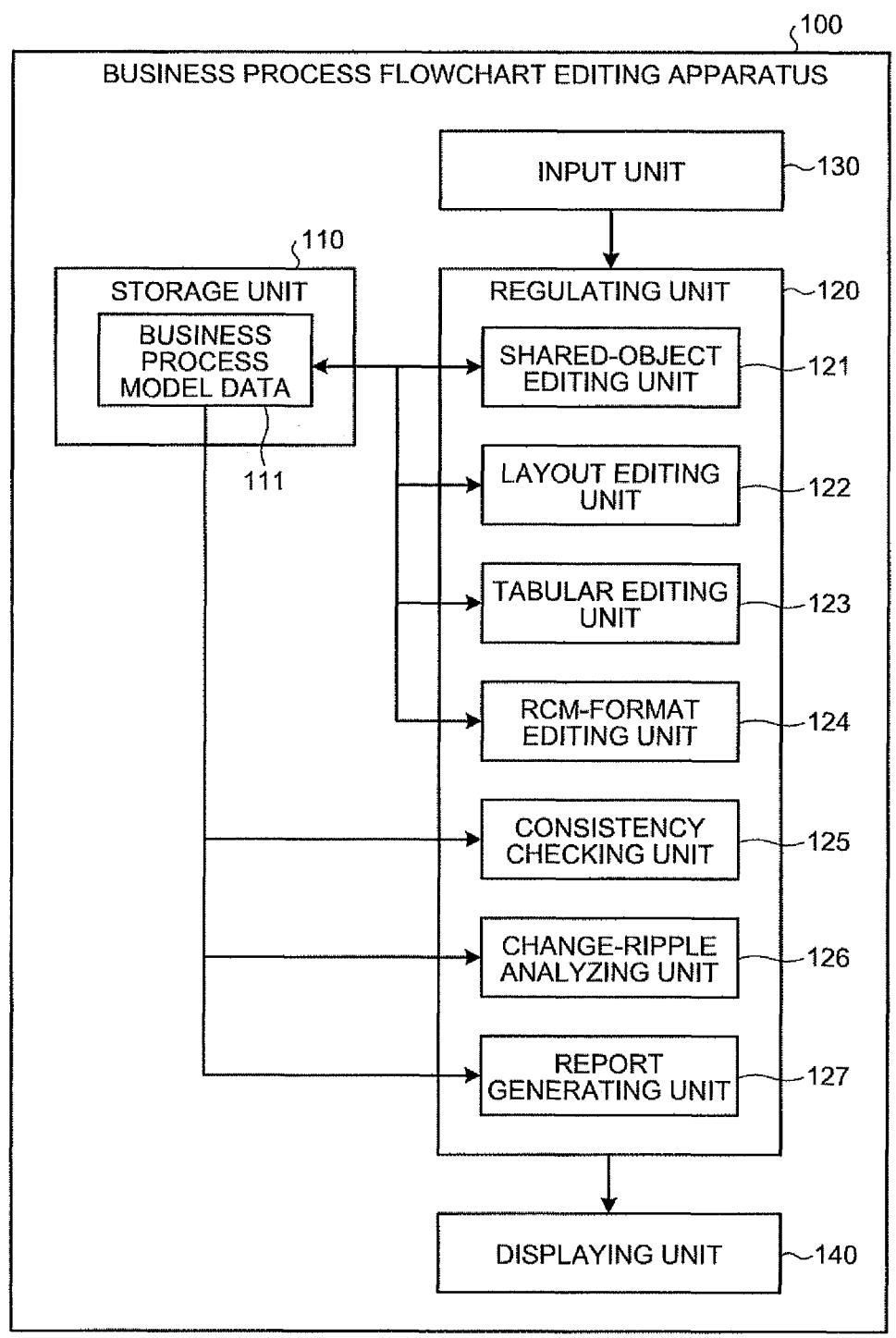
FIG. 5 is a functional block diagram of the configuration of the business process flowchart editing apparatus.

Next, the configuration of the business process flowchart editing apparatus 100 according to the present embodiment is explained. FIG. 5 is a functional block diagram of the configuration of the business process flowchart editing apparatus 100. As depicted in FIG. 5, the business process flowchart editing apparatus 100 includes a storage unit 110, a regulating (or controlling) unit 120, an input unit 130, and a displaying unit 140. The input unit 130 is formed of a keyboard or the like for inputting information. The displaying unit 140 is formed of a liquid-crystal displaying device or the like for displaying information.

Figure 6:
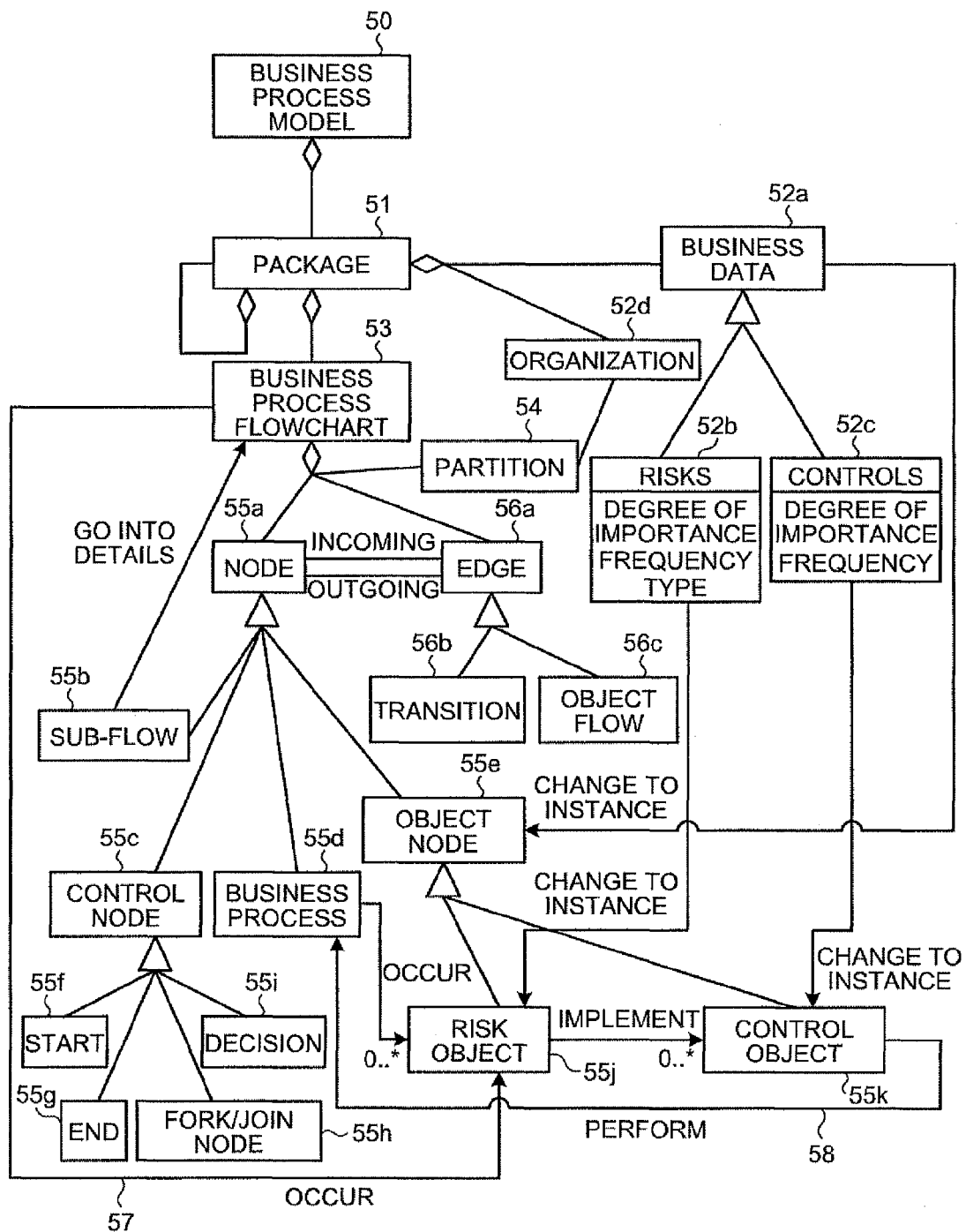
FIG. 6 is a drawing of a data structure of business process model data.
Figure 7:
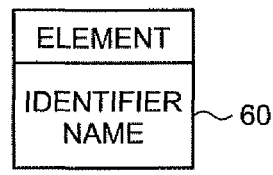
FIG. 7 is a drawing of the structure of an Element class.

The storage unit 110 is a storage unit having stored therein various information, that is, business process model data 111 corresponding to the business process model 10 depicted in FIG. 1. A data structure of the business process model data 111 is depicted in FIG. 6. Each object depicted in FIG. 6 has an Element class 60 depicted in FIG. 7 as a super-class, and also has attributes, that is, identifier and name.

The business process model 50 is an object managing the entire data structure, and can include a plurality of packages 51. The package 51 is an object for collectively managing a plurality of business process flowcharts, and can include a plurality of pieces of business data 52a, organizations 52d, and business process flowcharts 53. Also, one package 51 can include another package 51.

The business data 52a serves as a super-class of risks 52b and controls 52c. The risks 52b are shared objects each representing a risk substance with attributes, such as degree of importance, frequency, and type. The controls 52c are shared objects each representing a control substance with attributes, such as degree of importance and frequency. The risks 52b and the controls 52c are edited in the shared-object editing area 21. The organization 52d is a shared object representing a substance of a collection of people or information processing systems.

The business process flowchart 53 is an object corresponding to one sheet of a business process flowchart, and can include a plurality of a partition 54, a node 55a, and an edge 56a. The partition 54 is an object corresponding to a frame representing a collection of people or information processing systems in a business process flowchart, and refers to the organization 52d.

The node 55a serves as a super-class for a sub-flow 55b, a control node 55c, a business process 55d, and an object node 55e corresponding to various graphic elements in the business process flowchart. The sub-flow 55b is an object corresponding to a graphic element indicating that another business process flow that goes into details of a relevant portion of the business process flowchart is present. In the business process flowchart editing area 23, when the user selects the graphic element corresponding to the sub-flow 55b and performs a predetermined operation, another business process flowchart that goes into details of that portion is displayed on the business process flowchart editing area 23.

The control node 55c serves as a super-class for a start 55f, an end 55g, a fork/join node 55h, and a decision 55i corresponding to various graphic elements for controlling a flow of business processes in the business process flowchart. The business process 55d is an object corresponding to a graphic element indicative of a business process in the business process flowchart.

The object node 55e serves as a super-class for a risk object 55j and a control object 55k. The risk object 55j is an object corresponding to a graphic element indicating a risk in the business process flowchart, and refers to the risks 52b. The control object 55k is an object corresponding to a graphic element indicative of a control in the business process flowchart, and refers to the controls 52c. The risk object 55j and the control object 55k hold information about layout. Information about risk details is held in the risks 52b, and information about control details is held in the controls 52c.

For representation of an association among these business processes, risks, and controls, the business process 55d, the risk object 55j, and the control object 55k are related. Also, for clarification of a business process where the control is performed, the business process 55d and the control object 55k are related to each other via a relation 58.

Also, in this data structure, the business process flowchart 53 and the risk object 55j are related to each other with a relation 57. As such, a risk and a control can be associated with each other for not a business process but the entire business process flowchart.

The edge 56a serves as a super-class for a transition 56b and an object flow 56c corresponding to lines that connect various graphic elements in the business process flowchart. The transition 56b is an object indicative of a flow of business processes. The object flow 56c is an object indicative of a relation among the business process flowchart 53, the risk object 55j, and the control object 55k.

Figure 8:
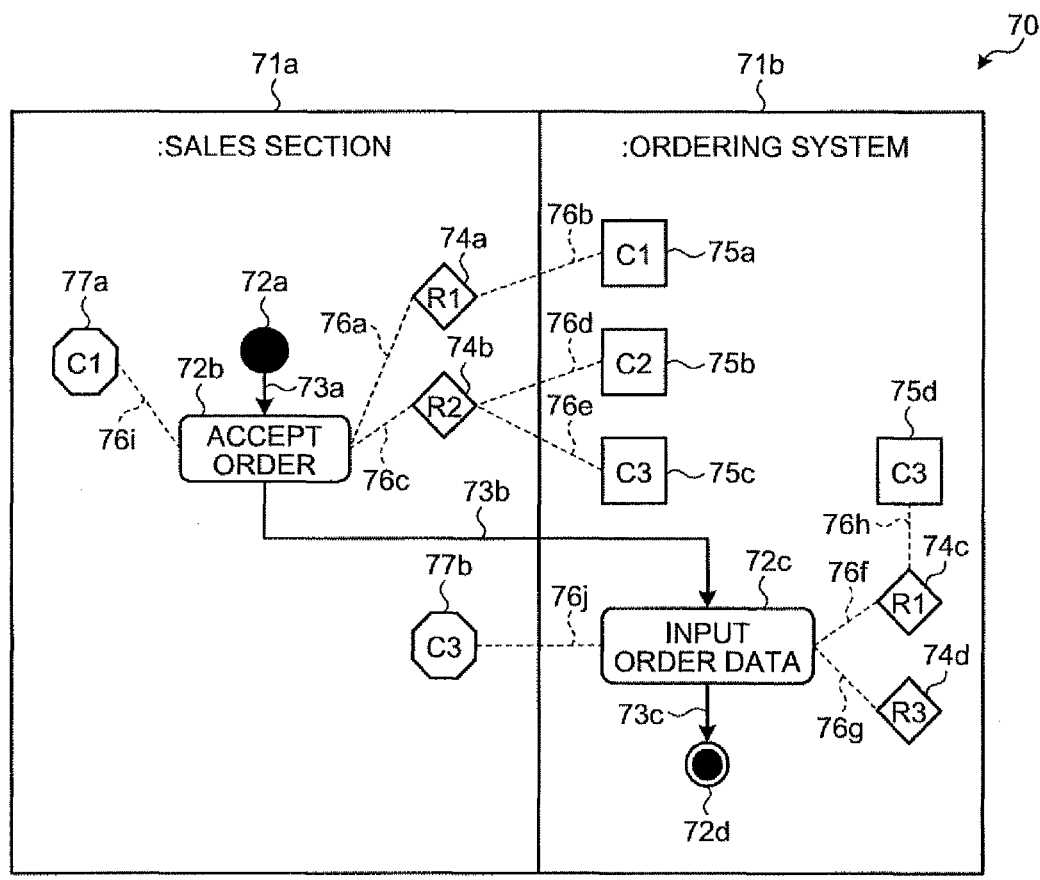
FIG. 8 is a drawing of a specific example of a business process flowchart.

Here, a specific example of a business process flowchart and data structure of the business process flowchart is explained. FIG. 8 is a drawing of a specific example of the business process flowchart. A business process flowchart 70 depicted in FIG. 8 is divided into an area represented by a partition 71a referring to an organization 84a with a name "sales section" as an attribute and an area represented by a partition 71b referring an organization 84b with a name "ordering system" as an attribute.

This business process flowchart represents that a business process with a name "accept order" is performed in the sales section and then a business process with a name "input order data" is performed in the ordering system.

For representation of this business process flow, a start 72a indicative of a starting point of a business process is connected via a transition 73a to a business process 72b with a name "accept order" as an attribute. The business process 72b is connected via a transition 73b to a business process 72c with a name "input order data" as an attribute. The business process 72c is connected via a transition 73c to an end 72d indicative of an end point of a business process. The business process 72b is laid out in the area indicated by the partition 71a, and the business process 72c is laid out in the area indicated by the partition 71b.

Also, this business process flowchart represents that a risk with a name "R1" and a risk with a name "R2" may occur in a business process with a name "accept order", a control with a name "C1" is performed for handling the former risk, and a control with a name "C2" and a control with a name "C3" are performed for handling the latter risk.

For representation of a relation among these business processes, risks, and controls, the business process 72b is connected via an object flow 76a to a risk object 74a that refers to a risk 82a with a name "R1" as an attribute and is connected via an object flow 76c to a risk object 74b that refers to a risk 82b with a name "R2" as an attribute.

The risk object 74a is connected via an object flow 76b to a control object 75a that refers to a control 83a with a name "C1" as an attribute. The risk object 74b is connected via an object flow 76d to a control object 75b that refers to a control 83b with a name "C2" as an attribute and is connected via an object flow 76e to a control object 75c that refers to a control 83c with a name "C3" as an attribute.

Furthermore, this business process flowchart represents that a risk with a name "R1" and a risk with a name "R3" may occur in a business process with a name "input order data", and a control with a name "C3" is performed for handling the former risk.

For representation of an relation among these business processes, risks, and controls, the business process 72c is connected via an object flow 76f to a risk object 74c that refers to the risk 82a with a name "R1" as an attribute and is connected via an object flow 76g to a risk object 74d that refers to a risk 82c with a name "R2" as an attribute.

The risk object 74c is connected via an object flow 76h to a control object 75d that refers to the control 83c with a name "C3" as an attribute.

This business process flowchart represents that a control with a name "C1" is performed in a business process with a name "accept order" and a control with a name of "C3" is performed in a business process with a name "input order data".

For representation of a relation among these business processes and controls, the business process 72b is connected via an object flow 76i to a control object 77a that refers to the control 83a with a name "C1" as an attribute. Also, the business process 72c is connected via an object flow 76j to a control object 77b that refers to the control 83c with a name "C3" as an attribute.

Figure 9:
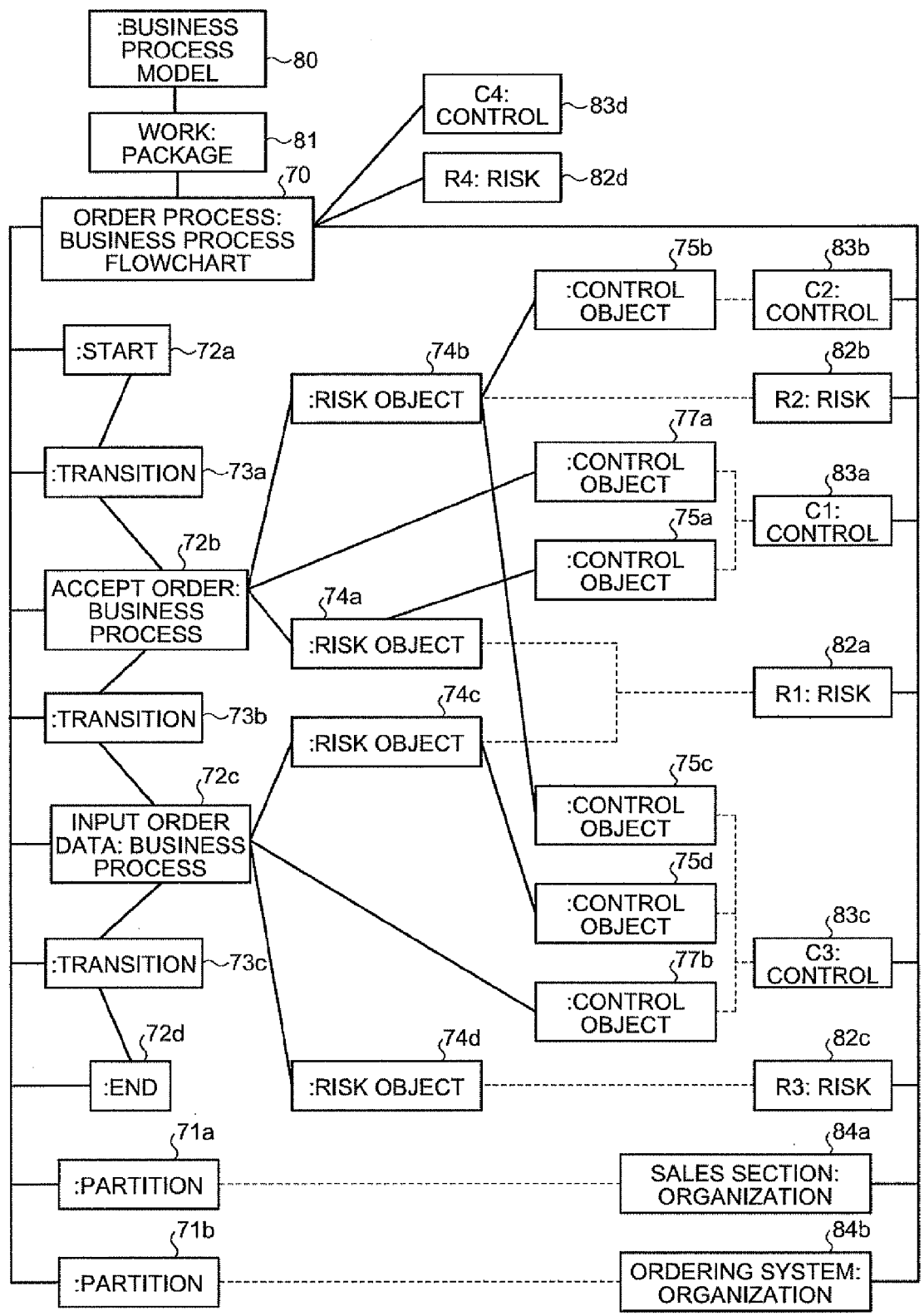
FIG. 9 is a drawing of a data structure corresponding to the business process flowchart depicted in FIG. 8.

FIG. 9 is a drawing of a data structure corresponding to the business process flowchart 70 depicted in FIG. 8. The structure of various data depicted in FIG. 9 corresponds to the structure of various graphic elements in the business process flowchart 70 depicted in FIG. 8. Note in FIG. 9 that a portion subsequent to ": (colon)" in each of the various data represents a type of the data and a portion preceding to ":" represents a name of the data. Each name of the business data is required to be unique.

Also, FIG. 9 represents that the business process flowchart 70 depicted in FIG. 8 is included in a package 81 and the package 81 is further included in a business process model 80, and also represents that while a risk 82d with a name "R4" as an attribute and a control 83d with a name "C4" as an attribute are registered, these risk and control are not being used in the business process flowchart 70. The user can easily know the presence of such risk and control that are registered but are not being used, from the function of a consistency checking unit 125, which will be explained further below.

Note in FIG. 9 that, to avoid complexity of the drawing, the object flows 76a to 76j are omitted.

Returning to explanation of FIG. 5, the regulating unit 120 is a controlling unit that controls the entire business process flowchart editing apparatus 100, and includes a shared-object editing unit 121, a layout editing unit 122, a tabular editing unit 123, an RCM-format editing unit 124, the consistency checking unit 125, a change-ripple analyzing unit 126, and a report generating unit 127.

The shared-object editing unit 121 is a processing unit that performs processes, such as generating the risks 52b and the controls 52c and changing and deleting an attribute, according to an operation performed by the user in the shared-object editing area 21. The shared-object editing unit 121 performs a check as required, such as a redundancy check, on the names of the risks 52b and the controls 52c so as to make sure that no contradiction occurs in the data model.

The layout editing unit 122 is a processing unit that performs processes, such as generating various data corresponding to sub-classes of the node 55a and the edge 56a and changing and deleting an attribute, according to an operation performed by the user in the business process flowchart editing area 23 and the property editing area 22.

For example, when the user performs a drag operation or the like to place in the business process flowchart editing area 23 one of the risks 52b registered in the shared-object editing area 21, the layout editing unit 122 generates the risk object 55j that refers to that risk 52b, and causes a graphic element corresponding to that risk object 55j to be displayed in the business process flowchart editing area 23. With the user performing a similar operation, a plurality of risk objects 55j that refer to the same risk 52b are generated.

Also, when the user performs an operation of connecting the graphic element corresponding to the risk object 55j to a graphic element corresponding to the business process 55d, the layout editing unit 122 relates the risk object 55j to the business process 55d, generates the object flow 56c, and causes a line connecting the risk object 55j and the graphic element corresponding to the business process 55d together to be displayed in the business process flowchart editing area 23.

Furthermore, when the user performs a drag operation or the like to place in the business process flowchart editing area 23 one of the controls 52c registered in the shared-object editing area 21, the layout editing unit 122 generates the control object 55k that refers to the control 52c and causes a graphic element corresponding to the control object 55k to be displayed in the business process flowchart editing area 23. With the user performing a similar operation, a plurality of control objects 55k that refer to the same control 52c are generated.

Still further, when the user performs an operation of connecting the graphic element corresponding to the control object 55k to a graphic element corresponding to the risk object 55j, the layout editing unit 122 relates the control object 55k to the risk object 55j, generates the object flow 56c, and causes a line connecting the control object 55k and the graphic element corresponding to the risk object 55j together to be displayed in the business process flowchart editing area 23.

Still further, when the user performs an operation of connecting the graphic element corresponding to the control object 55k to a graphic element corresponding to the business process 55d, the layout editing unit 122 relates the control object 55k to the business process 55d, generates the object flow 56c, and causes a line connecting the control object 55k and the graphic element corresponding to the business process 55d together to be displayed in the business process flowchart editing area 23.

The layout editing unit 122 performs a check as required, such as a check on data details, so as to make sure no contradiction occurs in the data model. For example, when the user tries to directly connect the graphic element corresponding to the control object 55k to the graphic element corresponding to the business process 55d, the layout editing unit 122 checks to see whether any risk object 55j related to the upstream business process 55d is related to another control object 55k that refers to the same control 52c, and when another relevant control object 55k is not present, rejects the operation of the user. This is because, if the place where the control is performed is clearly demonstrated, the control should be set so as to handle a risk in an upstream business process.

Also, the layout editing unit 122 restricts a display of risks and controls in a business process flowchart displayed in the business process flowchart editing area 23 and a business process flowchart output to a printing apparatus. Since risks and controls are derived in view of not only a financial aspect but also other aspects, such as customer satisfaction, different auditors are required according to the type of risk and control. Moreover, the auditor should display risks and controls, but risks and controls may be desirably not displayed to an audited side, in some cases.

In this manner, details to be displayed in the business process flowchart differ according to the purpose. However, generating flowcharts by purpose imposes a considerable burden. To get around such a burden, in the layout editing unit 122, only a risk with a type attribute having the same value as that of the specified type and a control related to that risk can be set to be displayed in the business process flowchart.

The tabular editing unit 123 is a processing unit that causes data, such as the business process 55d, the risk 52b, and the control 52c, to be displayed in a tabular format, and causes the user to edit the data. When a considerable change is to be made on the business process flowchart, editing on a tabular screen is faster than editing on a graphical screen provided by the shared-object editing unit 121 and the layout editing unit 122.

FIG. 10 is a drawing of an example of a tabular edit screen for editing the business process 55d. FIG. 11 is a drawing of an example of a tabular edit screen for editing risks 52b. FIG. 12 is a drawing of an example of a tabular edit screen for editing controls 52c. In such a tabular edit screen, as depicted in FIG. 10, an item indicating a relation with other data can be displayed. When the user changes this item, the data relation is also changed.

The RCM-format editing unit 124 is a processing unit that causes various data to be displayed in an RCM format and causes the user to edit the data. A RCM-format edit screen is suitable for users familiar with an RCM format because they are in charge of auditing or the like. FIG. 13 is a drawing of an example of an edit screen in an RCM format. As depicted in FIG. 13, even in the RCM-format edit screen an item indicating a relation with other data can be displayed. When the user changes this item, the data relation is also changed.

The consistency checking unit 125 is a processing unit that checks consistency of the generated business process flowchart. Specifically, the consistency checking unit 125 performs processes, such as a process of checking consistency between risks and business processes, a process of checking consistency between controls and business processes, a process of checking consistency between risks and controls, and a process of checking consistency of risk association.

The process of checking consistency between risks and business processes is a process of checking whether each generated risk 52b is connected to any business process 55d. The process of checking consistency between controls and business processes is a process of checking whether each generated risk 52b is connected to any business process 55d. The process of checking consistency between risks and controls is a process of checking whether each generated risk object 55j is connected to any control object 55k. The process of checking consistency of risk association is a process of extracting a risk and control not appropriately associated.

The change-ripple analyzing unit 126 is a processing unit that analyzes a target influenced by a change of the generated risk 52b and control 52c. Specifically, the change-ripple analyzing unit 126 extracts data connected to the risk 52b and the control 52 to be changed.

The report generating unit 127 is a processing unit that generates various reports for an audit or walk-through. The report generating unit 127 generates RCM, and also generates a report with information extracted according to various specified extraction conditions. For example, the report generating unit 127 generates a list of risks 52b and controls 52c by the degree of importance or frequency.

FIG. 14 is a drawing of an example of a report generated by the report generating unit 127. FIG. 14 depicts an example of a report generated by merging information about the related business process 55d with the control 52c extracted according to an extraction condition that the practical supervisor of the control is the "management division". When information about the business process flowchart is provided to a third party, the range to be disclosed may be required to be adjusted according to the party. In such a case, the function of extracting only the information related to a specific division is useful.

Next, a process procedure of the business process flowchart editing apparatus 100 is explained. Note that an example of the process result in the following explanation of the process procedure is the one when the details of the business process model data 111 are as depicted in FIG. 6.

Figure 15:
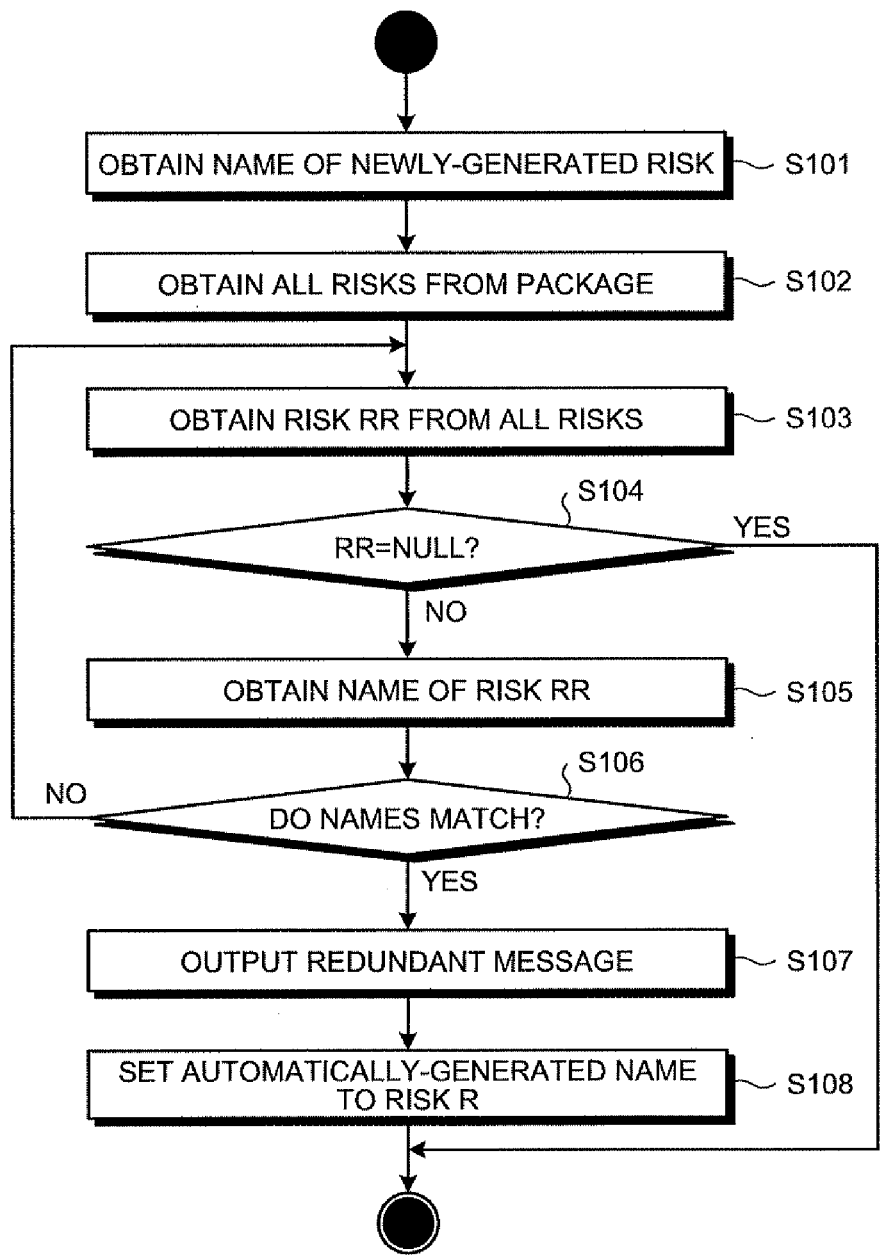
FIG. 15 is a flowchart of a procedure of a name-redundancy checking process by a shared-object editing unit.

FIG. 15 is a flowchart of a procedure of a name-redundancy checking process by the shared-object editing unit 121. Note that FIG. 15 depicts a procedure of a process of checking redundancy of risk names when a risk is newly generated in the shared-object editing area. Even when a control is newly generated, a name-redundancy checking process is performed with a similar process procedure.

As depicted in FIG. 15, after obtaining the name of a newly-generated risk R (step S101), the shared-object editing unit 121 obtains all risks included in the same package (step S102). Then, obtaining any unprocessed risk RR from the obtained all risks is tried (step S103). If such an unprocessed risk cannot be obtained (YES at step S104), it is determined that no name redundancy is present, and the procedure ends.

When any unprocessed risk RR is obtained at step S103 (NO at step S104), the name of the risk RR is obtained (step S105). Then, when the obtained name matches the name of the risk R obtained at step S101 (YES at step S106), a message indicative of redundancy between the name of the newly-registered risk and the name of the existing risk is displayed (step S107). Then, a name automatically generated so as not to match with the name of the existing risk is set to the risk R and the procedure ends (step S108).

When the name of the risk RR obtained at step S105 does not match the name of the risk R (NO at step S106), the procedure returns to step S103, trying to obtain any unprocessed risk RR from all risks obtained at step S102.

Figure 16:
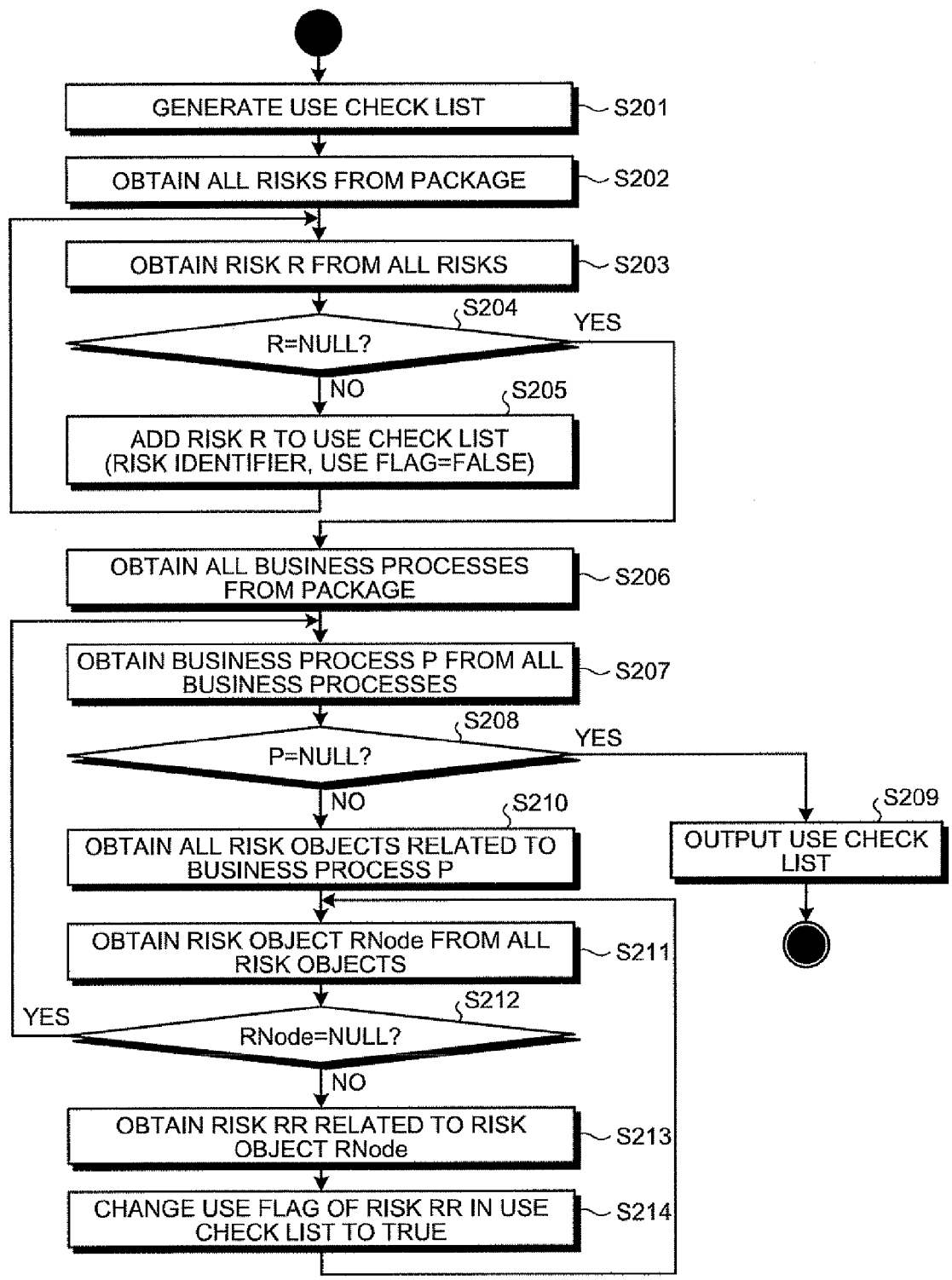
FIG. 16 is a flowchart of the procedure of a process of checking consistency between risks and business processes by a consistency checking unit.

FIG. 16 is a flowchart of the procedure of a process of checking consistency between risks and business processes by the consistency checking unit 125. This process is performed when the user performs a predetermined operation to clearly make an instruction for executing this process, and also can be automatically performed when the generated business process flowchart is stored or when the editing of the business process flowchart is terminated.

As depicted in FIG. 16, when instructed to execute the process of checking consistency between risks and business processes, the consistency checking unit 125 generates a blank use check list (step S201), and then obtains all risks included in the same package (step S202).

Then, obtaining any unprocessed risk R from all risks obtained at step S202 is tried (step S203). If such an unprocessed risk can be obtained (NO at step S204), a combination of the identifier of the risk R and a use flag set as False is added to the use check list (step S205), and then the procedure returns to step S203 to try to obtain the next risk R.

In this manner, when elements corresponding to all risks obtained at step S202 are added to the use check list (YES at step S204), the consistency checking unit 125 obtains all business processes included in the same package (step S206). Then, obtaining any unprocessed business process P from the obtained all business processes is tried (step S207). If such an unprocessed risk cannot be obtained (YES at step S208), the use check list is output and the procedure ends (step S209).

When any unprocessed business process P can be obtained at step S207 (NO at step S208), all risk objects related to the business process P are obtained (step S210). Then, obtaining an unprocessed risk object RNode from the obtained all risk objects is tried (step S211). If such an unprocessed risk object cannot be obtained (YES at step S212), the procedure returns to step S207 to try to obtain the next business process P.

If any unprocessed risk object RNode can be obtained at step S211 (NO at step S212), a risk RR related to the risk object RNode is obtained (step S213), the value of the use flag corresponding to the risk RR in the use check list is changed to True (step S214), and then the procedure returns to step S211, trying to obtain the next risk object RNode.

FIG. 17 is a drawing of an example of an output of the process of checking consistency between risks and business processes by the consistency checking unit 125. As depicted in FIG. 17, as a result of the process of checking consistency between risks and business processes, combinations of the name of a risk and a value indicating that whether the risk is related to any business process are output.

Here, in the example depicted in FIG. 17, all risks are included in an output. Alternatively, only risks not related to any business process may be output. Still alternatively, no output may be made when risks not related to any business process are absent.

Figure 18:
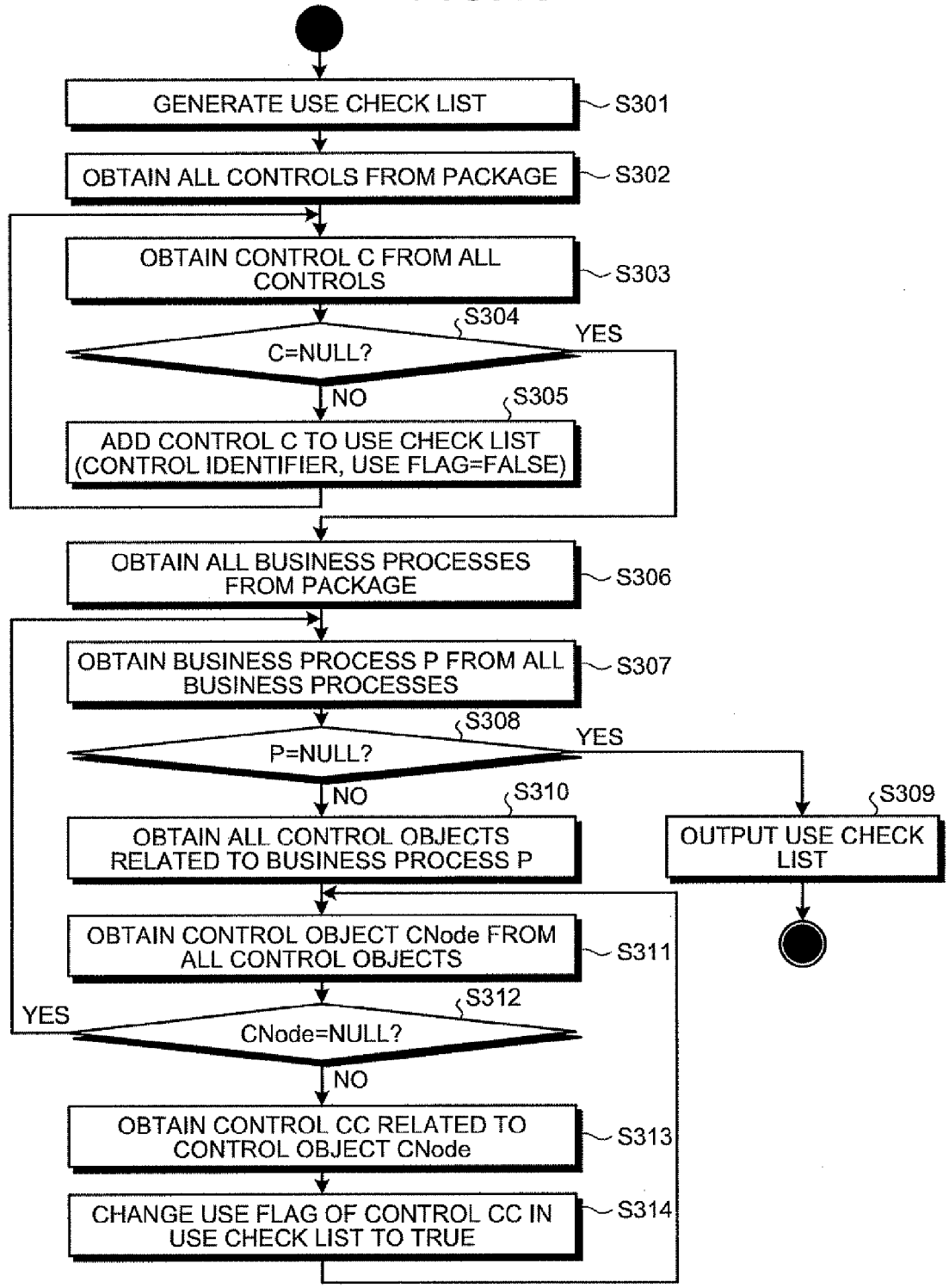
FIG. 18 is a flowchart of the procedure of a process of checking consistency between controls and business processes by the consistency checking unit.

FIG. 18 is a flowchart of the procedure of a process of checking consistency between controls and business processes by the consistency checking unit 125. This process is performed when the user performs a predetermined operation to clearly make an instruction for executing this process, and also can be automatically performed when the generated business process flowchart is stored or when the editing of the business process flowchart is terminated.

As depicted in FIG. 18, when instructed to execute a process of checking consistency between controls and business processes, the consistency checking unit 125 generates a blank use check list (step S301), and then obtains all controls included in the same package (step S302).

Then, obtaining any unprocessed control C from all controls obtained at step S302 is tried (step S303). If such a control can be obtained (NO at step S304), a combination of the identifier of the control C and a use flag set as False is added to the use check list (step S305), and then the procedure returns to step S303, trying to obtain the next control C.

In this manner, when elements corresponding to all controls obtained at step S302 are added to the use check list (YES at step S304), the consistency checking unit 125 obtains all business processes included in the same package (step S306). Then, obtaining any unprocessed business process P from the obtained all business processes is tried (step S307).

If such an unprocessed business process cannot be obtained (YES at step S308), the use check list is output and the procedure ends (step S309).

If an unprocessed business process P can be obtained at step S307 (NO at step S308), all control objects related to the business process P are obtained (step S310). Then, obtaining any unprocessed control object CNode from the obtained all control objects is tried (step S311). If such an unprocessed control object cannot be obtained (YES at step S312), the procedure returns to step S307, trying to obtain the next business process P.

If an unprocessed control object CNode can be obtained at step S311 (NO at step S312), a control CC related to the control object CNode is obtained (step S313), and the value of the use flag corresponding to the control CC in the use check list is changed to True (step S314). Then, the procedure returns to step S311, trying to obtain the next control object CNode.

Figures 19, 20:
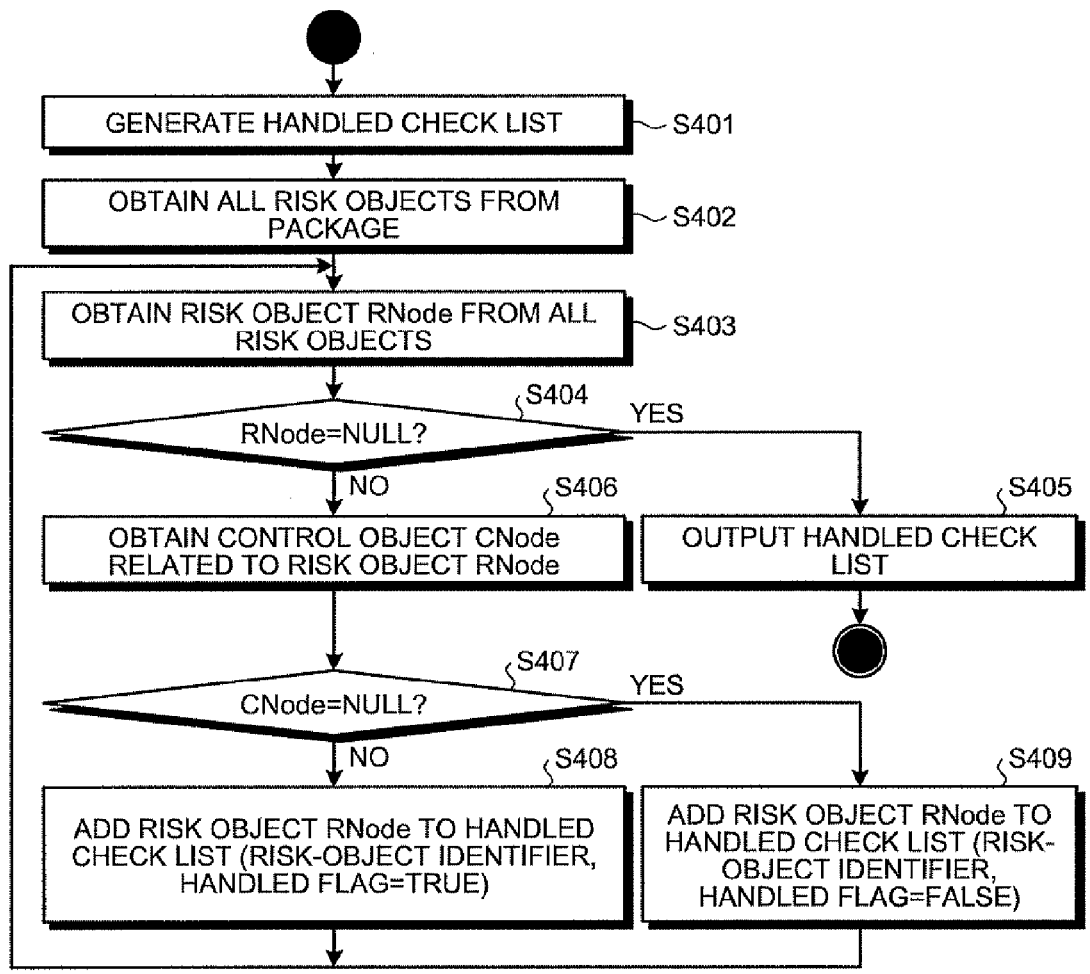
FIG. 19 is a drawing of an example of an output of the process of checking consistency between controls and business processes by the consistency checking unit.
FIG. 20 is a flowchart of the procedure of a process of checking consistency between risks and controls by the consistency checking unit.

FIG. 19 is a drawing of an example of an output of the process of checking consistency between controls and business processes by the consistency checking unit 125. As depicted in FIG. 19, as a result of the process of checking consistency between controls and business processes, combinations of the name of a control and a value indicating that whether the control is related to any business process are output.

Here, in the example depicted in FIG. 19, all controls are included in an output. Alternatively, only controls not related to any business process may be output. Still alternatively, no output may be made when controls not related to any business processes are absent.

FIG. 20 is a flowchart of the procedure of a process of checking consistency between risks and controls by the consistency checking unit 125. This process is performed when the user performs a predetermined operation to clearly make an instruction for executing this process, and also can be automatically performed when the generated business process flowchart is stored or when the editing of the business process flowchart is terminated.

As depicted in FIG. 20, when instructed to execute a process of checking consistency between risks and controls, the consistency checking unit 125 generates a blank handled check list (step S401), and then obtains all risk objects included in the same package (step S402).

Then, obtaining any unprocessed risk object RNode from all risk objects obtained at step S402 is tried (step S403). If such an unprocessed risk object cannot be obtained (YES at step S404), the handled check list is output and the procedure ends (step S405).

If an unprocessed risk object RNode can be obtained at step S403 (NO at step S404), a control object CNode related to the risk object RNode is obtained (step S406).

Then, if such a control object CNode can be obtained (NO at step S407), a combination of the identifier of the risk object RNode and a handled flag set as True is added to the handled check list (step S408). If such a control object CNode cannot be obtained (YES at step S407), a combination of the identifier of the risk object RNode and a handled flag set as False is added to the handled check list (step S409). In this manner, after elements are added to the handled check list, the procedure returns to step S403, and trying to obtain the next risk object RNode.

Figure 21:
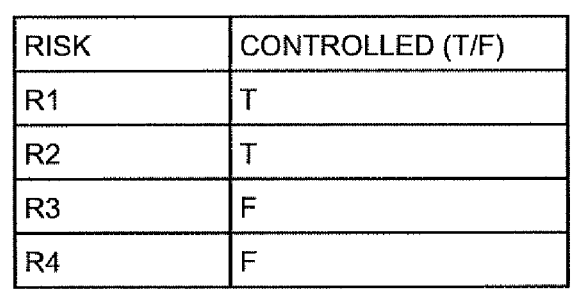

FIG. 21 is a drawing of an example of an output of the process of checking consistency between risks and controls by the consistency checking unit 125. As depicted in FIG. 21, as a result of the process of checking consistency between risks and controls, combinations of the name of a risk and a value indicating that whether the risk is related to any control are output.

Here, in the example depicted in FIG. 21, all risks are included in an output. Alternatively, only risks not related to any control may be output. Still alternatively, no output may be made when risks not related to any control are absent.

Figure 22:
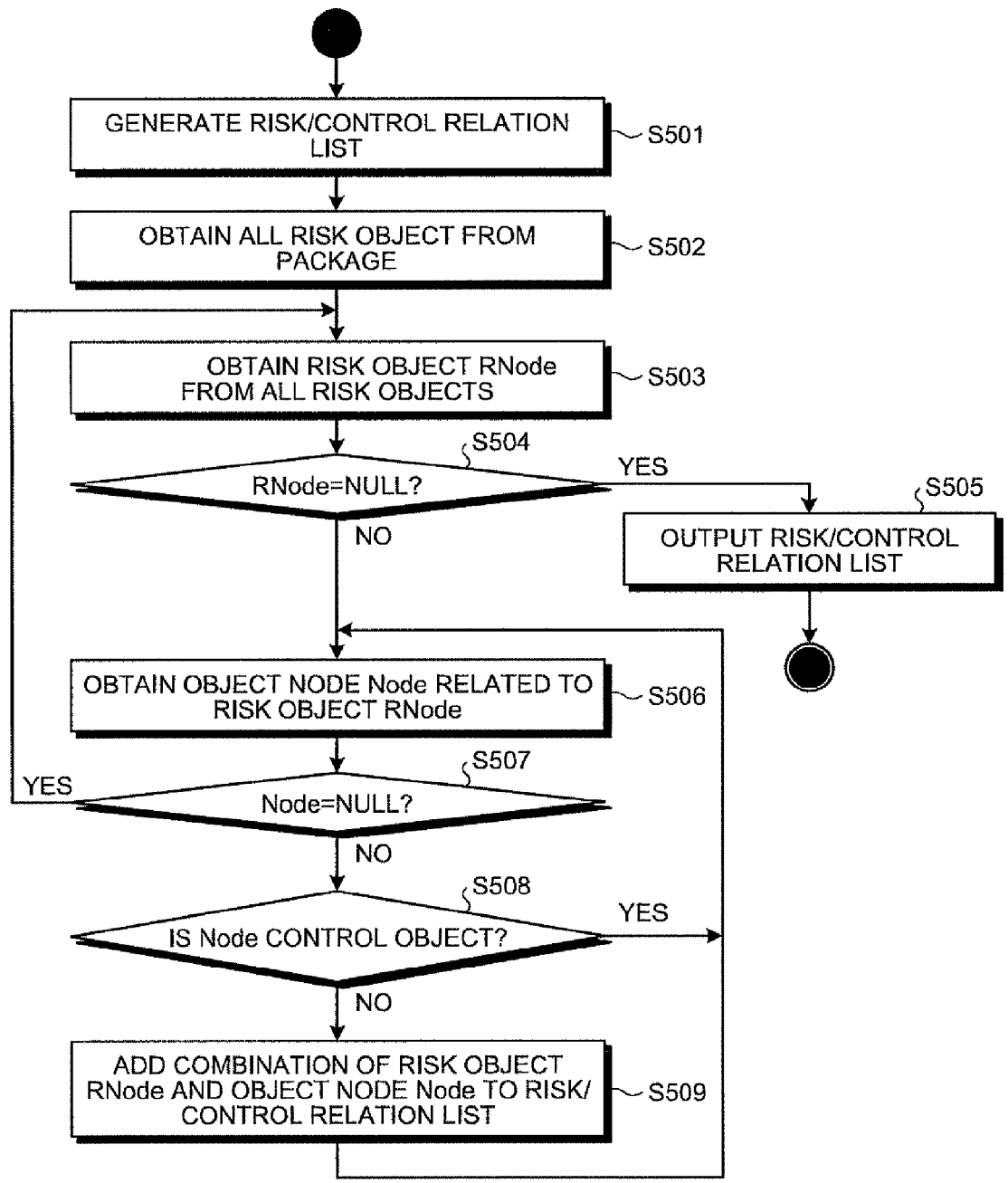
FIG. 22 is a flowchart of the procedure of a process of checking consistency of risk association by the consistency checking unit.

FIG. 22 is a flowchart of the procedure of a process of checking consistency of risk association by the consistency checking unit 125. This process is performed when the user performs a predetermined operation to clearly make an instruction for executing this process, and also can be automatically performed when the generated business process flowchart is stored or when the editing of the business process flowchart is terminated.

As depicted in FIG. 22, when instructed to execute a process of checking consistency of risk association, the consistency checking unit 125 generates a blank risk/control relation list (step S501), and then obtains all risk objects included in the same package (step S502).

Then, obtaining any unprocessed risk object RNode from all risk objects obtained at step S502 is tried (step S503). If such an unprocessed risk object cannot be obtained (YES at step S504), the risk/control relation list is output and the procedure ends (step S505).

If such an unprocessed risk object RNode can be obtained at step S503 (NO at step S504), obtaining an object node Node related to risk object RNode is tried (step S506). If such an object node Node cannot be obtained (YES at step S507), the procedure returns to step S503, trying to obtain the risk object RNode.

If an object node Node related to the risk object RNode can be obtained (NO at step S507) and the object node Node is not a control object (NO at step S508), a combination of the identifier of the risk object RNode and the identifier of the object node Node is added to the risk/control relation list (step S509), and then the procedure returns to step S506. If the object node Node is a control object (YES at step S508), the procedure directly returns to step S506.

As a result of this process, a list of risks associated with object nodes other than controls, that is, risks associated with risks, is output.

Figures 23, 24:
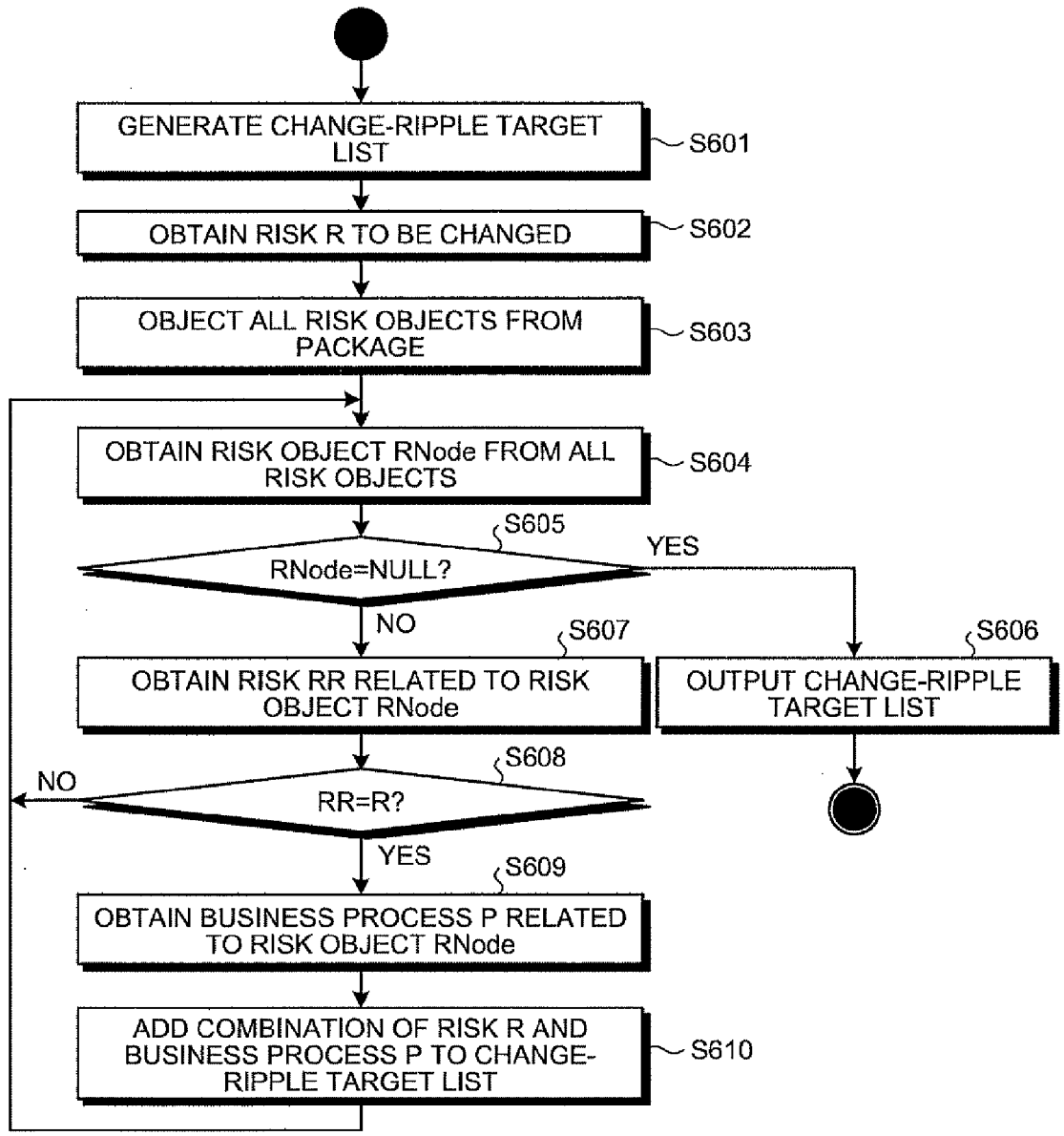
FIG. 23 is a flowchart of the procedure of a risk-change ripple analyzing process by a change-ripple analyzing unit.
FIG. 24 is a drawing of an example of an output of the risk-change ripple analyzing process by the change-ripple analyzing unit.

FIG. 23 is a flowchart of the procedure of a risk-change ripple analyzing process by the change-ripple analyzing unit 126. This process is performed when the user performs a predetermined operation to clearly make an instruction for executing this process.

As depicted in FIG. 23, when instructed to execute a risk-change ripple analyzing process, the change-ripple analyzing unit 126 generates a blank change-ripple target list (step S601), obtains a risk R to be changed (step S602), and then obtains all risk objects included in the same package (step S603).

Then, obtaining any unprocessed risk object RNode from all risk objects obtained at step S603 is tried (step S604). If such an unprocessed risk object cannot be obtained (YES at step S605), the change-ripple target list is output and the procedure ends (step S606).

If such an unprocessed risk object RNode can be obtained at step S604 (NO at step S605), a risk RR related to the risk object RNode is obtained (step S607). Here, if the risk RR is not identical to the risk R (NO at step S608), the procedure returns to step S604, trying to obtain the next risk object RNode.

On the other hand, if the risk RR is identical to the risk R (YES at step S608), a business process P related to the risk object RNode is obtained (step S609), a combination of the risk R and the business process P is added to the change-ripple target list (step S610), and then the procedure returns to step S604 to obtain the next risk object RNode.

FIG. 24 is a drawing of an example of an output of the risk-change ripple analyzing process by the change-ripple analyzing unit 126. As depicted in FIG. 24, as a result of the risk-change ripple analyzing process, a list of the business processes related to the risks to be changed is output.

Figure 25:
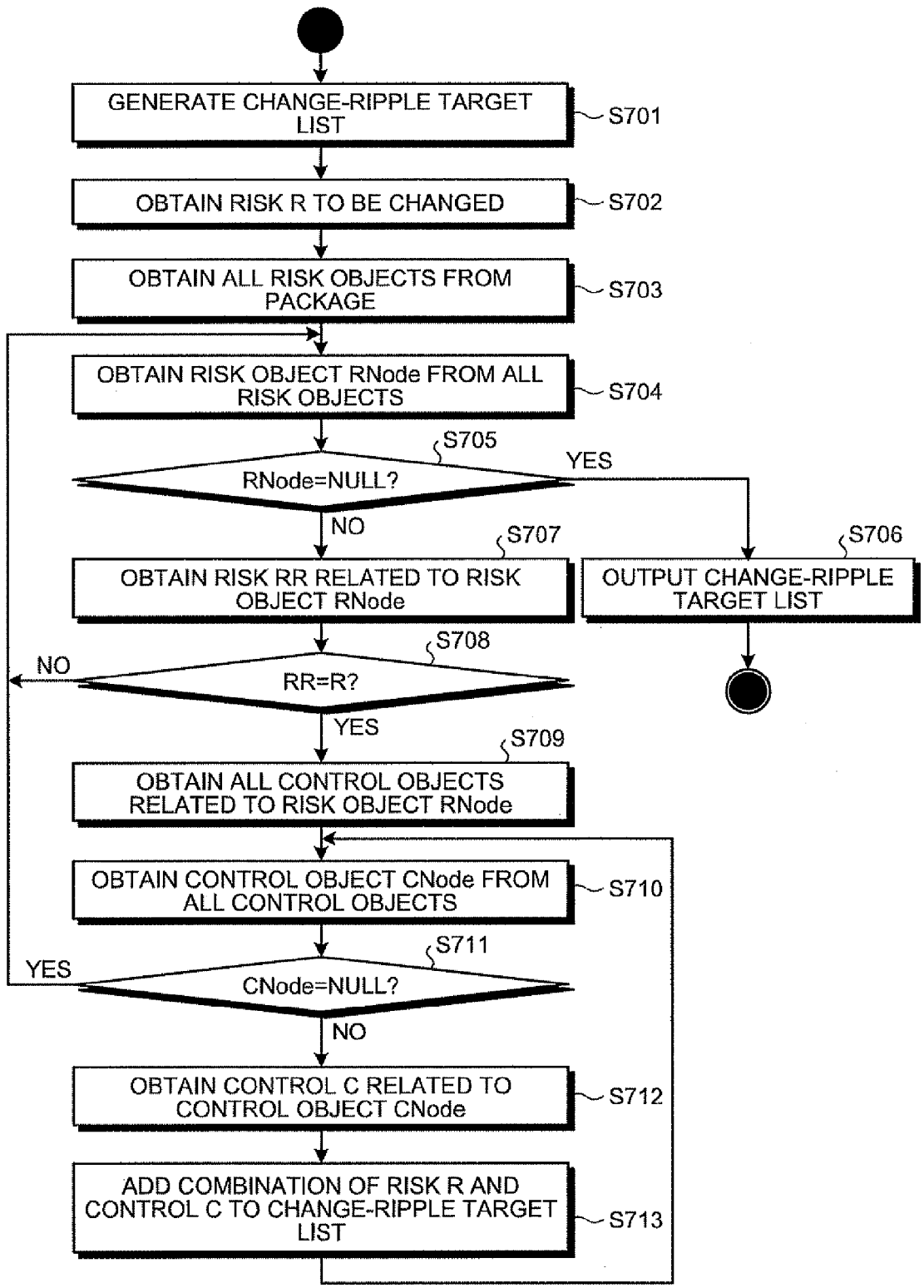
FIG. 25 is a flowchart of the procedure of another risk-change ripple analyzing process by the change-ripple analyzing unit.

FIG. 25 is a flowchart of the procedure of another risk-change ripple analyzing process by the change-ripple analyzing unit 126. This process is performed when the user performs a predetermined operation to clearly make an instruction for executing this process. Also, this process may be automatically performed in succession of the risk-change ripple analyzing process depicted in FIG. 23.

As depicted in FIG. 25, when instructed to execute another risk-change ripple analyzing process, the change-ripple analyzing unit 126 generates a blank change-ripple target list (step S701), obtains a risk R to be changed (step S702), and then obtains all risk objects included in the same package (step S703).

Then, obtaining any unprocessed risk object RNode from all risk objects obtained at step S703 is tried (step S704). If such an unprocessed risk object cannot be obtained (YES at step S705), the change-ripple target list is output and the procedure ends (step S706).

If an unprocessed risk object RNode can be obtained at step S704 (NO at step S705), a risk RR related to the risk object RNode is obtained (step S707). Here, if the risk RR is not identical to the risk R (NO at step S708), the procedure returns to step S704, trying to obtain the next risk object RNode.

On the other hand, if the risk RR is identical to the risk R (YES at step S708), all control objects related to the risk object RNode are obtained (step S709). Then, obtaining any unprocessed control object CNode from all obtained control objects is tried (step S710). If such an unprocessed control object cannot be obtained (YES at step S711), the procedure returns to step S704, trying to obtain the next risk object RNode.

If such an unprocessed control object CNode can be obtained at step S710 (NO at step S711), a control C related to the control object CNode is obtained (step S712), a combination of the risk R and the control C is added to the change-ripple target list (step S713), and then the procedure returns to step S710, trying to obtain the next control object CNode.

FIG. 26 is a drawing of an example of an output of the other risk-change ripple analyzing process by the change-ripple analyzing unit 126. As depicted in FIG. 26, as a result of another risk-change ripple analyzing process, a list of the controls related to the risks to be changed is output.

Figure 27:
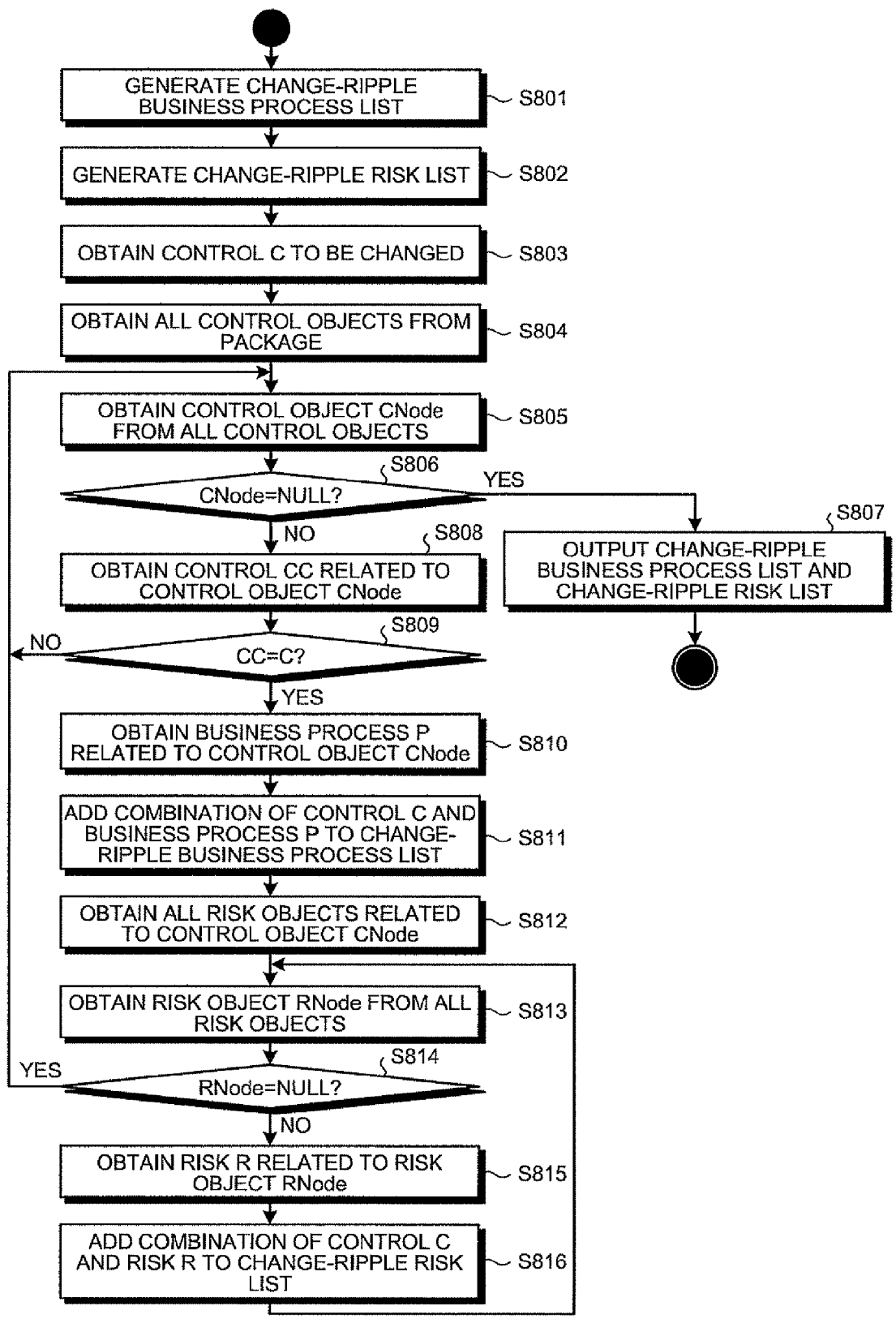
FIG. 27 is a flowchart of the procedure of a control-change ripple analyzing process by the change-ripple analyzing unit.

FIG. 27 is a flowchart of the procedure of a control-change ripple analyzing process by the change-ripple analyzing unit 126. This process is performed when the user performs a predetermined operation to clearly make an instruction for executing this process.

As depicted in FIG. 27, when instructed to execute a control-change ripple analyzing process, the change-ripple analyzing unit 126 generates a blank change-ripple business process list (step S801), and generates a blank change-ripple risk list (step S802). Then, a control C to be changed is obtained (step S803), and all control objects included in the same package are obtained (step S804).

Then, obtaining any unprocessed control object CNode from all control objects obtained at step S804 is tried (step S805). If such an unprocessed control object cannot be obtained (YES at step S806), the change-ripple business process list and the change-ripple risk list are output and the procedure ends (step S807).

If such an unprocessed control object CNode can be obtained at step S805 (NO at step S806), a control CC related to the control object CNode is obtained (step S808). Here, if the control CC is not identical to the control C (NO at step S809), the procedure returns to step S805, trying to obtain the next control object CNode.

On the other hand, if the control CC is identical to the control C (YES at step S809), a business process P related to the control object node CNode is obtained (step S810), and a combination of the control C and the business process P is added to the change-ripple business process list (step S811).

Furthermore, risk objects related to the control object CNode are obtained (step S812). Then, obtaining any unprocessed risk object RNode from the obtained all risk objects is tried (step S813). If such an unprocessed risk object cannot be obtained (YES at step S814), the procedure returns to step S805, trying to obtain the next control object CNode.

If such an unprocessed risk object RNode can be obtained at step S813 (NO at step S814), a risk R related to the risk object RNode is obtained (step S815), a combination of the control C and the risk R is added to the change-ripple risk list (step S816), and then the procedure returns to step S813, trying to obtain the next risk object RNode.

FIGS. 28 and 29 are drawings of examples of an output of the control-change ripple analyzing process by the change-ripple analyzing unit 126. FIG. 28 depicts the output result of the change-ripple business process list, which is a list of business processes related to the control to be changed. FIG. 29 depicts the output result of the change-ripple risk list, which is a list of risks related to control to be changed.

Note that the configuration of the business process flowchart editing apparatus 100 according to the present embodiment depicted in FIG. 5 can be variously changed without deviating from the gist of the present invention. For example, by implementing the functions of the regulating unit 120 of the business process flowchart editing apparatus 100 as software and executing this software on a computer, functions equivalent to those of the business process flowchart editing apparatus 100 can be achieved. In the following, an example of the computer executing a business process flowchart editing program 1071 with the functions of the regulating unit 120 implemented as software is explained.

Figure 30:
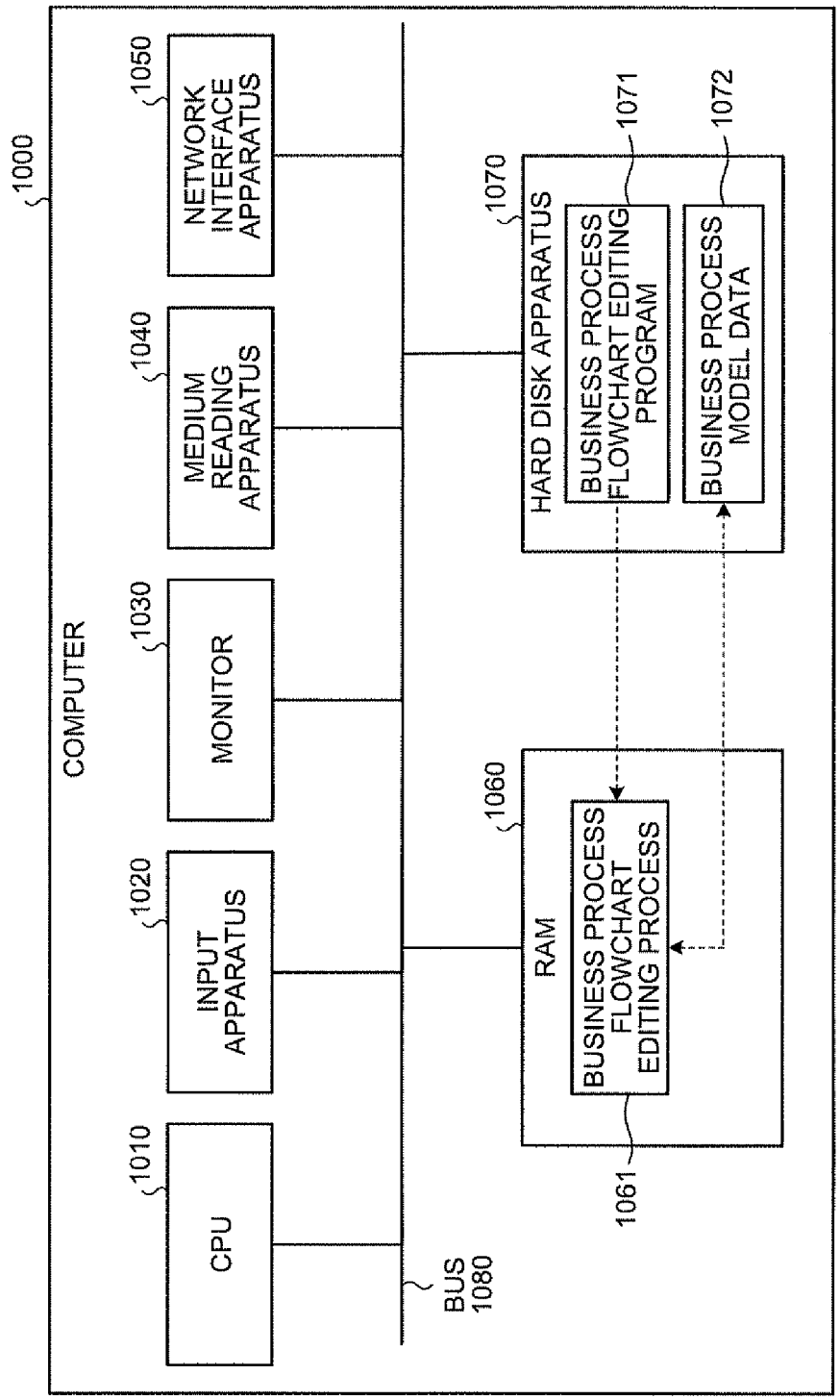
FIG. 30 is a functional block diagram of a computer executing a business process flowchart editing program.

FIG. 30 is a functional block diagram of a computer 1000 executing the business process flowchart editing program 1071. The computer 1000 includes a central processing unit (CPU) 1010 that executes various computing processes, an input apparatus 1020 that accepts an input of data from the user, a monitor 1030 that displays various information, a medium reading apparatus 1040 that reads programs and others from a recording medium, a network interface apparatus 1050 that transmits and receives data to and from another computer via a network, a random access memory (RAM) 1060 that temporarily stores various information, and a hard disk apparatus 1070, all of which are connected via a bus 1080.

The hard disk apparatus 1070 has stored therein the business process flowchart editing program 1071 having a function similar to that of the regulating unit 120 depicted in FIG. 5 and a business process model data 1072 corresponding to the business process model data 111 depicted in FIG. 5. The business process model data 1072 can be distributed as required to be stored in another computer connected via the network.

With the CPU 1010 reading the business process flowchart editing program 1071 from the hard disk apparatus 1070 and developing the program onto the RAM 1060, the business process flowchart editing program 1071 functions as a business process flowchart editing process 1061. In the business process flowchart editing process 1061, information and others read from the business process model data 1072 are developed onto an area assigned to its own on the RAM 1060, and various data processes are performed based on the developed data and others.

Here, the business process flowchart editing program 1071 is not necessarily required to be stored in the hard disk apparatus 1070, and this program stored in a storage medium, such as a compact-disk read only memory (CD-ROM), may be read by the computer 1000 for execution. Also, this program may be stored in another computer (or server) connected to the computer 1000 via a public line, the Internet, a local area network (LAN), a wide area network (WAN), or the like, and may be then read by the computer 1000 for execution.

According to the embodiments, the program is configured so that a data structure in which business processes and controls are directly associated can be generated. With this, even when a business process in which a risk occurs and a business process in which the risk is to be handled are different, a business process where a control is performed can be clearly demonstrated.

According to the embodiments, the program is configured so that a data structure in which business processes and controls are directly associated can be generated after an existing data structure is verified. With this, a data structure without contradiction can be generated.

According to the embodiments, the program is configured so that which type of risk and its corresponding control are to be displayed in a business process flowchart can be controlled by specifying a condition. With this, which risk and control are to be displayed and which risk and control are not to be displayed can be arbitrarily changed according to the party to whom the business process flowchart is to be presented.

According to the embodiments, the program is configured so that inconsistency of the generated data structure can be detected. With this, the number of processes of a business process flowchart verifying operation can be reduced, thereby improving the quality of a business process flowchart to be generated.

According to the embodiments, the program is configured so that an influenced portion when a shared object is changed can be detected. With this, it is possible to avoid a situation in which a change of a business process flowchart inadvertently changes another business process flowchart.

In the business process flowchart editing program and business process flowchart according to the embodiments, information about a business process flowchart and risks and controls, and their relation are managed into a business process model in a unified manner. With this, the following effects can be achieved. That is, these pieces of information can be efficiently edited. Furthermore, a consistency check on the edited information and an analysis of a change-ripple target can be performed. Thus, efficiency in documentation of internal control can be increased.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A business process flowchart editing program product having a non-transitory computer-readable recording medium that stores therein a computer program that causes a computer to execute:

registering in advance an object including information about a risk that occurs in a business process and an object including information about a control that handles the risk, the objects being registered as shared objects;

placing a graphic element corresponding to any of the registered objects on a business process flowchart;

associating the graphic element with the business process forming the business process flowchart;

checking, when the graphic element corresponding to the object including the information about the control is related to the business process, to see whether data corresponding to an upstream business process of the business process in the business process flowchart is, via any object including the information about the risk, related to the object including the information about the control;

generating, when it is checked at the checking that data corresponding to the upstream business process is related to the object including the information about the control, a data structure in which data corresponding to the object and data corresponding to the business process are related to each other;

rejecting, when it is checked at the checking that data corresponding to the upstream business process is not related to the object including the information about the control, the generation of the data structure;

checking consistency of the generated data structure to see whether the object including the information about the risk is related to another object including the information about the risk in the business process flowchart; and outputting, when it is checked at the checking of consistency of the generated data structure that the object including the information about the risk is related to the another object including the information about the risk in the business process flowchart, the object including the information about the risk as a list of the risks not appropriately associated.

2. The business process flowchart editing program product according to claim 1, wherein when associating the graphic element with the business process, of the objects registered as the shared object, only a graphical element corresponding to an object including information relevant to a specified condition of the business process is displayed in the business process flowchart.

3. The business process flowchart editing program product according to claim 1, wherein it is checked whether the object including the information about the risk is related to data corresponding to the business process.

4. The business process flowchart editing program product according to claim 1, wherein it is checked whether the object including the information about the control is related to data corresponding to the business process.

5. The business process flowchart editing program product according to claim 1, wherein
it is checked whether the object including the information about the risk is related to the object including the information about the control.

6. The business process flowchart editing program product according to claim 1, further comprising
reporting a business process and a control affected by a change in the information about the risk.

7. The business process flowchart editing program product according to claim 6, wherein
reporting a business process and a risk affected by the change in the information about the control.

8. The business process flowchart editing program product according to claim 1, wherein
when the graphic element corresponding to the object including the information about the risk is related to the business process flowchart, the data structure is generated in which data corresponding to the object and data corresponding to the business process flowchart are related to each other.

9. The business process flowchart editing program product according to claim 1, wherein
a redundancy check is performed so as to avoid redundancy of a name of the object to be registered.

10. The business process flowchart editing program product according to claim 1, further comprising
causing an edit screen to be displayed on a displaying unit, the edit screen for editing the input information in a tabular format.

11. The business process flowchart editing program product according to claim 1, further comprising
causing an edit screen to be displayed on a displaying unit, the edit screen for editing the input information in an RCM format.

12. The business process flowchart editing program product according to claim 1, further comprising
generating a report in which the input information is edited according to a frequency of occurrence.

13. The business process flowchart editing program product according to claim 1, further comprising
extracting the input information according to a predetermined extraction condition and editing the extraction result to generate a report.

14. A business process flowchart editing apparatus comprising:
a processor; and
a memory, wherein the processor executes:
registering in advance an object including information about a risk that occurs in a business process and an object including information about a control that handles the risk, the objects being registered as shared objects;
placing a graphic element corresponding to any of the objects registered by the shared-object editing unit on a business process flowchart;
associating the graphic element with the business process forming the business process flowchart;
checking, when the graphic element corresponding to the object including the information about the control is related to the business process, to see whether data corresponding to an upstream business process of the business process in the business process flowchart is, via any object including the information about the risk, related to the object including the information about the control;
generating, when it is checked at the checking that data corresponding to the upstream business process is related to the object including the information about the control, a data structure in which data corresponding to the object and data corresponding to the business process are related to each other;
rejecting, when it is checked at the checking that data corresponding to the upstream business process is not related to the object including the information about the control, the generation of the data structure;
checking consistency of the generated data structure to see whether the object including the information about the risk is related to another object including the information about the risk in the business process flowchart; and
outputting, when it is checked at the checking of consistency of the generated data structure that the object including the information about the risk is related to the another object including the information about the risk in the business process flowchart, the object including the information about the risk as a list of the risks not appropriately associated.

15. A business process flowchart editing method comprising:
registering in advance an object including information about a risk that occurs in a business process and an object including information about a control that handles the risk, the objects being registered as shared objects, using a processor;
placing a graphic element corresponding to any of the registered objects on a business process flowchart, using the processor;
associating the graphic element with the business process forming the business process flowchart, using the processor;
checking, when the graphic element corresponding to the object including the information about the control is related to the business process, to see whether data corresponding to an upstream business process of the business process in the business process flowchart is, via any object including the information about the risk, related to the object including the information about the control, using the processor;
generating, when it is checked at the checking that data corresponding to the upstream business process is related to the object including the information about the control, a data structure in which data corresponding to the object and data corresponding to the business process are related to each other, using the processor;
rejecting, when it is checked at the checking that data corresponding to the upstream business process is not related to the object including the information about the control, the generation of the data structure, using the processor;
checking consistency of the generated data structure to see whether the object including the information about the risk is related to another object including the information about the risk in the business process flowchart, using the processor; and
outputting, when it is checked at the checking of consistency of the generated data structure that the object including the information about the risk is related to the another object including the information about the risk in the business process flowchart, the object including the information about the risk as a list of the risks not appropriately associated, using the processor.

* * * * *